US007066382B2

(12) United States Patent
Kaplan

(10) Patent No.: US 7,066,382 B2
(45) Date of Patent: Jun. 27, 2006

(54) METHOD AND APPARATUS FOR TRANSFERRING OR RECEIVING DATA VIA THE INTERNET SECURELY

(76) Inventor: Robert Kaplan, 4 Creswick Walk, London (GB) NW11 6AN ( * ) Notice: Subject to any disclaimer, the term of this patent is extended or adjusted under 35 U.S.C. 154(b) by 263 days.

(21) Appl. No.: 10/275,179

(22) PCT Filed: Apr. 17, 2001

(86) PCT No.: PCT/GB01/01710

§ 371 (c)(1),
(2), (4) Date: Oct. 28, 2002

(87) PCT Pub. No.: WO01/80191

PCT Pub. Date: Oct. 25, 2001

(65) Prior Publication Data

US 2004/0215963 A1    Oct. 28, 2004

(30) Foreign Application Priority Data

Apr. 17, 2000 (GB) ................................ 0009485.4
Sep. 8, 2000 (GB) ................................ 0022028.5
Mar. 13, 2001 (GB) ................................ 0106114.2

(51) Int. Cl.
  *G06F 17/00* (2006.01)
(52) U.S. Cl. ...................................... 235/375; 235/380
(58) Field of Classification Search ................ 235/375, 235/380; 710/5; 705/1
  See application file for complete search history.

(56) References Cited

U.S. PATENT DOCUMENTS

| 5,905,248 A * | 5/1999 | Russell et al. ......... 235/462.15 |
| 6,012,102 A * | 1/2000 | Shachar ........................ 710/5 |
| 6,152,369 A * | 11/2000 | Wilz et al. ............. 235/462.01 |
| 2003/0065567 A1 * | 4/2003 | Dodson et al. ................ 705/16 |
| 2003/0173405 A1 * | 9/2003 | Wilz et al. ............. 235/462.01 |
| 2005/0187785 A1 * | 8/2005 | McIntyre et al. ............... 705/1 |
| 2005/0193339 A1 * | 9/2005 | Meyers ........................ 715/700 |

\* cited by examiner

*Primary Examiner*—Thien M. Le
*Assistant Examiner*—Daniel A. Hess

(57) ABSTRACT

A system using magnetic stripe encoded swipe cards containing Internet address data and further data and whose address data strings are obfuscated. An account card data de-obfuscation sequence in accordance with embodiments of the present invention. The account card data is read from the magnetic stripe and decoded (601) to enable the swipe card reader to parse the data string. The first operation would identify the card as being account card data from the information contained in the data code identifier (602), then the next section would be the unique card specific instruction code (603) then the level of security required to send the data encoded on the swipe card over the Internet (604) followed by the account number (605) then the account holders name (606) followed by any additional data on the card holder (607) the next section would instruct the reader to hold back data until the server a connection to the server were established and the enter a PIN or other validation method when requested by the server (608) this section could be for any additional data relevant to the card (609) then an end sentinel to tell the card nor further data (610) then the data correction parity check to make sure all the data was read correctly from the swipe card by the swipe card reader (611). The card data would then be encrypted by the swipe card reader prior to transmitting it at the security level indicated on the card, the data may also be hidden by use of steganography techniques in a multimedia file.

20 Claims, 14 Drawing Sheets

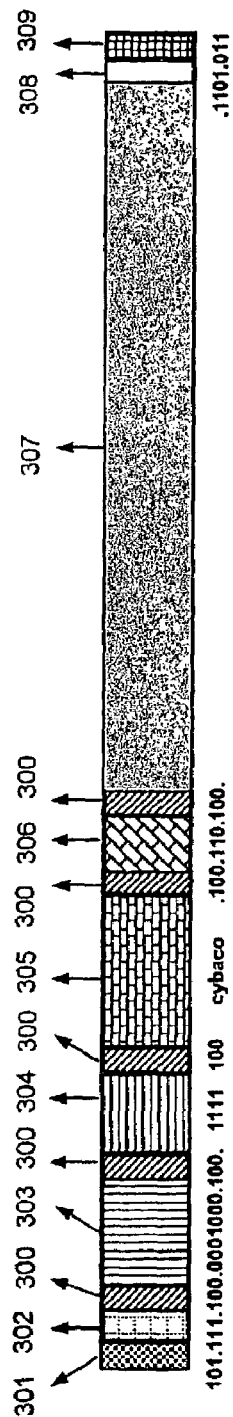
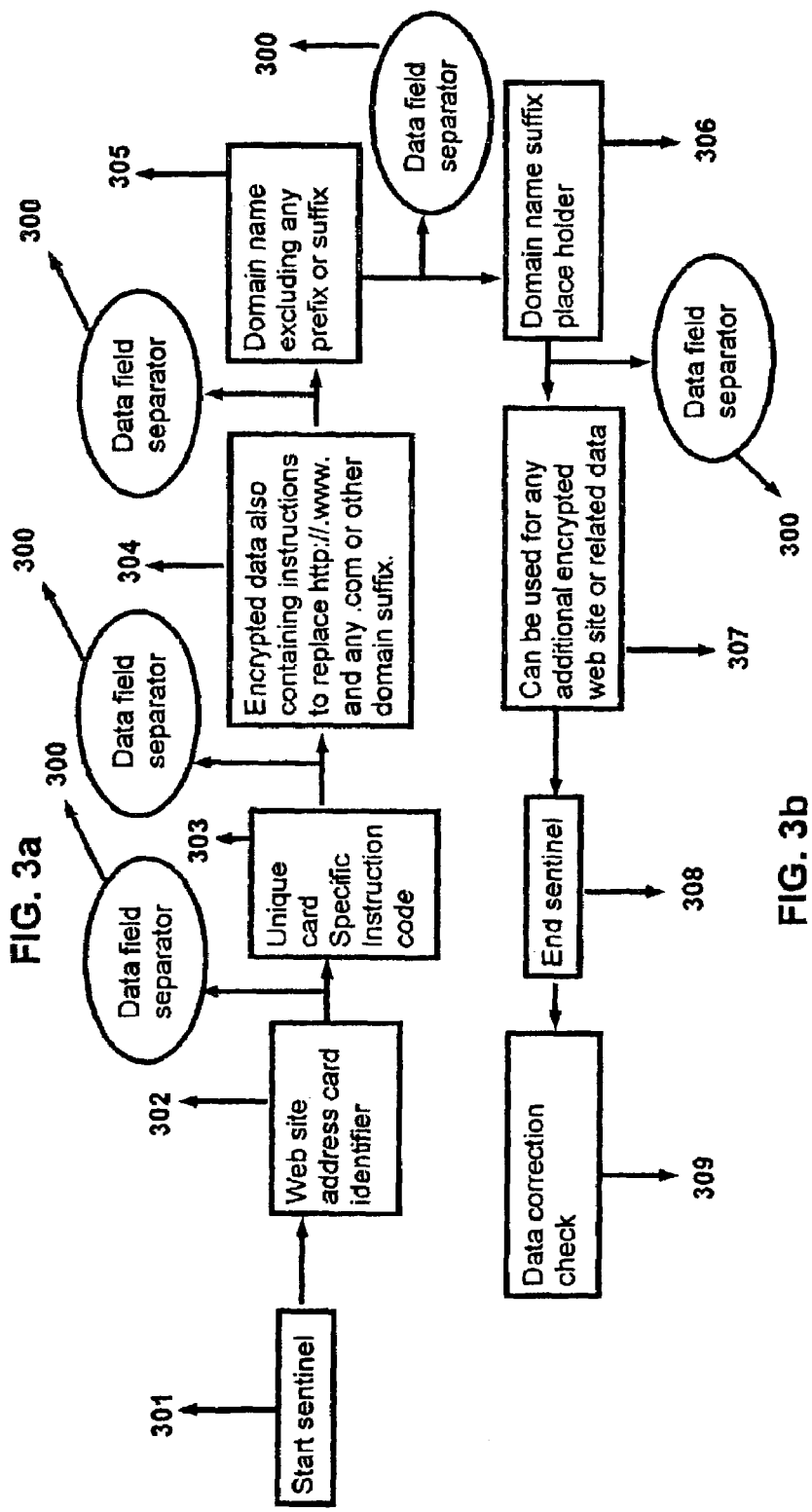
FIG. 3a
FIG. 3b

METHOD AND APPARATUS FOR TRANSFERRING OR RECEIVING DATA VIA THE INTERNET SECURELY

This application is claims priority to PCT/GB01/01710 filed Apr. 17, 2001, which claims priority to UK 00009485.4 filed Apr. 17, 2000, UK 0022028.5 filed Sep. 8, 2000 and UK 0106114.2 filed Mar. 13, 2001.

The present invention relates to a method and apparatus for accessing web sites or servers to enable transferring or receiving secure data via the Internet by use of a dedicated swipe card reader and magnetically encoded swipe cards, thereby, eliminating some of the difficulties encountered when using any of the known methods of accessing web sites or servers and the transferring of data to and from them securely.

With the growth of the Internet it has also become increasingly viable for individuals to use the Internet for more than just email or viewing web pages as it now encompasses everyday usage for banking, purchasing goods, buying and selling securities, account verification and many other secure functions. Through out this growth it has still been necessary to manual input passwords, addresses and account details which gives rise to the possibility that the data may be open to Trojan hacking or keyboard sniffers that capture keystrokes to detect passwords or account details when entering data manually to a computer.

Additionally there are difficulties at present for restricting access to web sites or servers or data stored at a server to authorized individuals only. There are also problems with how to pay for goods purchased from a web site securely or validate any financial transaction when making purchases that involve the exchange of account details that include credit card or debit card details and the online secure payment of bills.

There is also a need to stop unauthorized access to the Internet or limited access to only certain web sites or servers as approved by those who have responsibility to govern what may or may not be accessed on the Internet whether it be at work or at home.

The present invention aims to solve some of the above problems and also provide an alternative method and apparatus to enable a user to pay for services such as viewing, downloading information or the purchasing of goods or services securely and also aims to provide a method for enabling a user to access a restricted web site or server or direct exchange phone number or data stored at a web site or server securely or address an e-mail or account details or passwords with fewer opportunities for human error or the threat of hacking than in prior art.

In accordance with one aspect of the present invention, there is provided a magnetic stripe swipe card encoded with unique data that enables a dedicated swipe card reader to determine whether the swipe card pertains to a web site or server address, a direct server phone number or an e-mail address, or account details on a credit or debit card or pre paid or other account card or a password or restricted data for opening a secure site as determined by said dedicated swipe card reader that also determines the best method to encrypt if required and transmit the data as encoded on a swipe card.

In accordance with another aspect of the present invention, there is provided the obfuscation of the address data string that is then encoded onto a magnetic stripe of a swipe card to enable the reduction of all repetitive Internet nomenclature on a swipe card to reduce the amount of data encoded onto a magnetic stripe of a swipe card is thereby freeing extra space on the magnetic stripe for encoding additional data.

In accordance with a another aspect of the present invention the encrypted address data string on a swipe card is parsed by a dedicated swipe card reader to determine what action to take with regards to reassembling, encrypting or encoding the data prior to transmitting and also what device driver applications may be required according to the card type and individual card issuers instruction data on the swipe card as read by said swipe card reader.

In accordance with a Further aspect of the present invention prior to transmitting, the data obfuscation or encryption is performed by the proprietary swipe card reader that computes the address data string to enable utilising a pre set encryption key using prime numbers in conjunction with random number generation if required for added security, the dedicated swipe card reader would first read the data on a swipe card decode the data then parse the data string to determine whether the encoded data related to a web site, direct line phone number, e-mail address, bank credit or debit account card data or secure, restricted or password access data to enable reassembling the address data string ready for encrypting and transmitting to the web site or server.

In accordance with a further aspect of the present invention, there is provided a proprietary swipe card encoder for encoding swipe cards with encrypted data for accessing web site address and related data, e-mail address and related data, telephone exchange number and related data, pre payment or other account swipe cards and related data, web site security, passwords and related data and Bank provided credit and debit account swipe card and related data and access restriction and related data including any news groups and related data said swipe card encoder comprising an encoding means for placing address data onto a Swipe Card in a proprietary encrypted form.

In accordance with another aspect of the present invention, there is provided a read only track in the Reader although it may contain two read only tracks or even have read/write track to enable updating security data on a swipe card after accessing an account or secure site on a server or data base. This read/write track may be situated on two different tracks or on as many tracks as required.

In accordance with a further embodiment of the present invention a swipe card is swiped through a dedicated swipe card reader to enable the address data on the swipe card to be transmitted by attaching the address data to a radio signal that is then received by a dedicated swipe card reader containing a radio data signal receiver built into it or it may be received by other proprietary radio data receiving devices such as mobile phones or PDA's.

In accordance with a further embodiment of the present invention, prior to transmitting any data as recorded on a swipe card or a file accessed using data on a swipe card the data may be hidden using steganography in a multimedia file such as WAV, or JPEG or any other suitable multimedia data file by a dedicated swipe card reader that would also determine if the data should be encrypted first and to what security level prior to hiding the data in a said multimedia file. This multimedia file would then be transmitted to the relative server or web site as indicated on the swipe card where it would be parsed to reveal the data, this data could be secure access data, password data, account access data or any other data as referenced by the data on a swipe card.

Embodiments of the present invention will now be described by way of example with reference to the accompanying drawings, in which:

FIG. 1. is a schematic diagram of a magnetic stripe containing simple basic encrypted web site address data A. and e-mail address data B.;

FIG. 2a. is a schematic diagram of a swipe card containing address data on a magnetic stripe;

FIG. 2b. is a schematic diagram of a swipe card containing one track with data recorded on it and one track ready for the reader to record data on;

FIG. 2c. is a schematic diagram of a swipe card with both web site address data on one side and e-mail address data on the opposite side;

FIG. 3a is a schematic diagram of a simple web site address access data encoding sequence in accordance with embodiments of the present invention;

FIG. 3b is a flow diagram of a the simple web site address access data encoding sequence in accordance with FIG. 3a;

Figure 13:
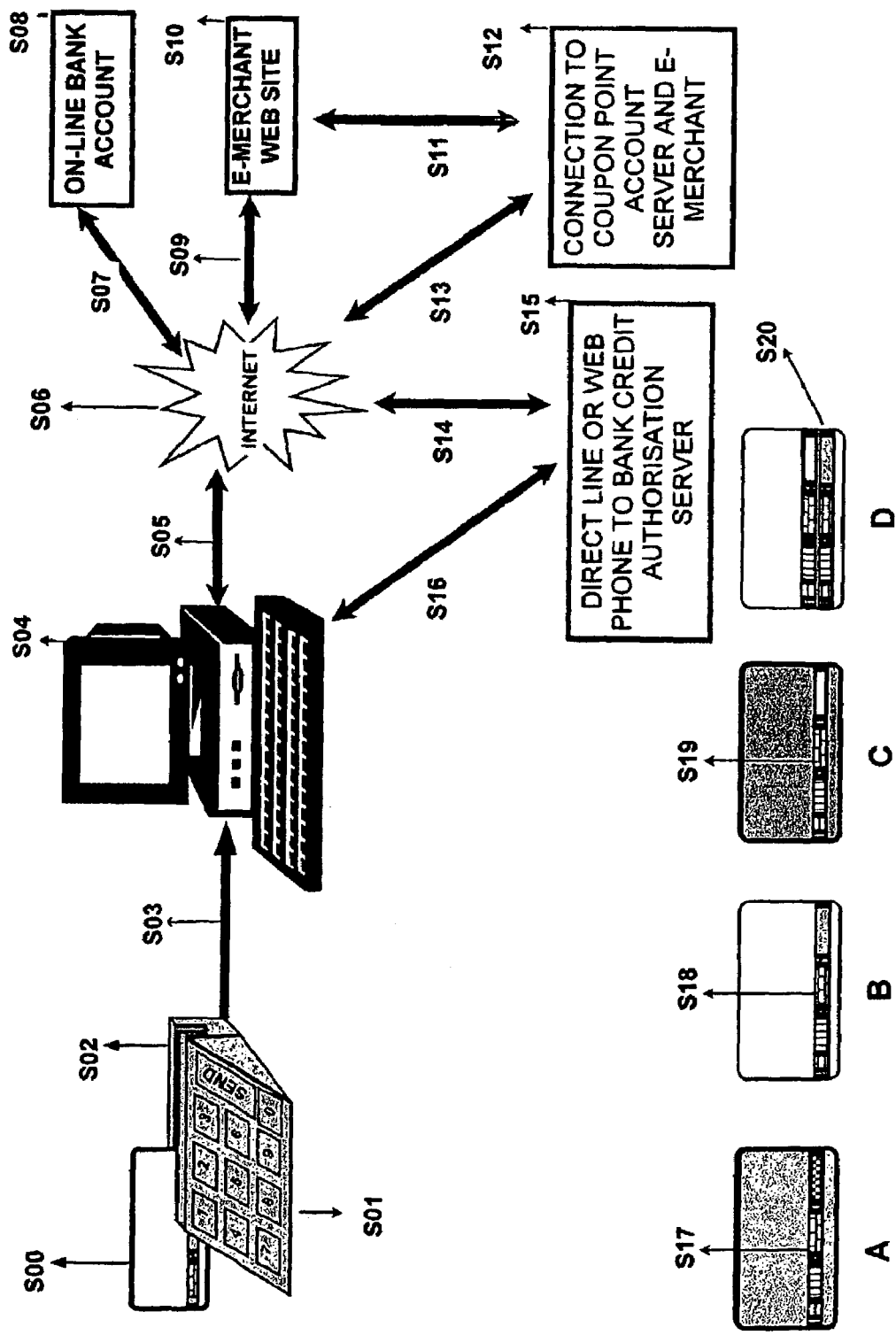
Figure 14:
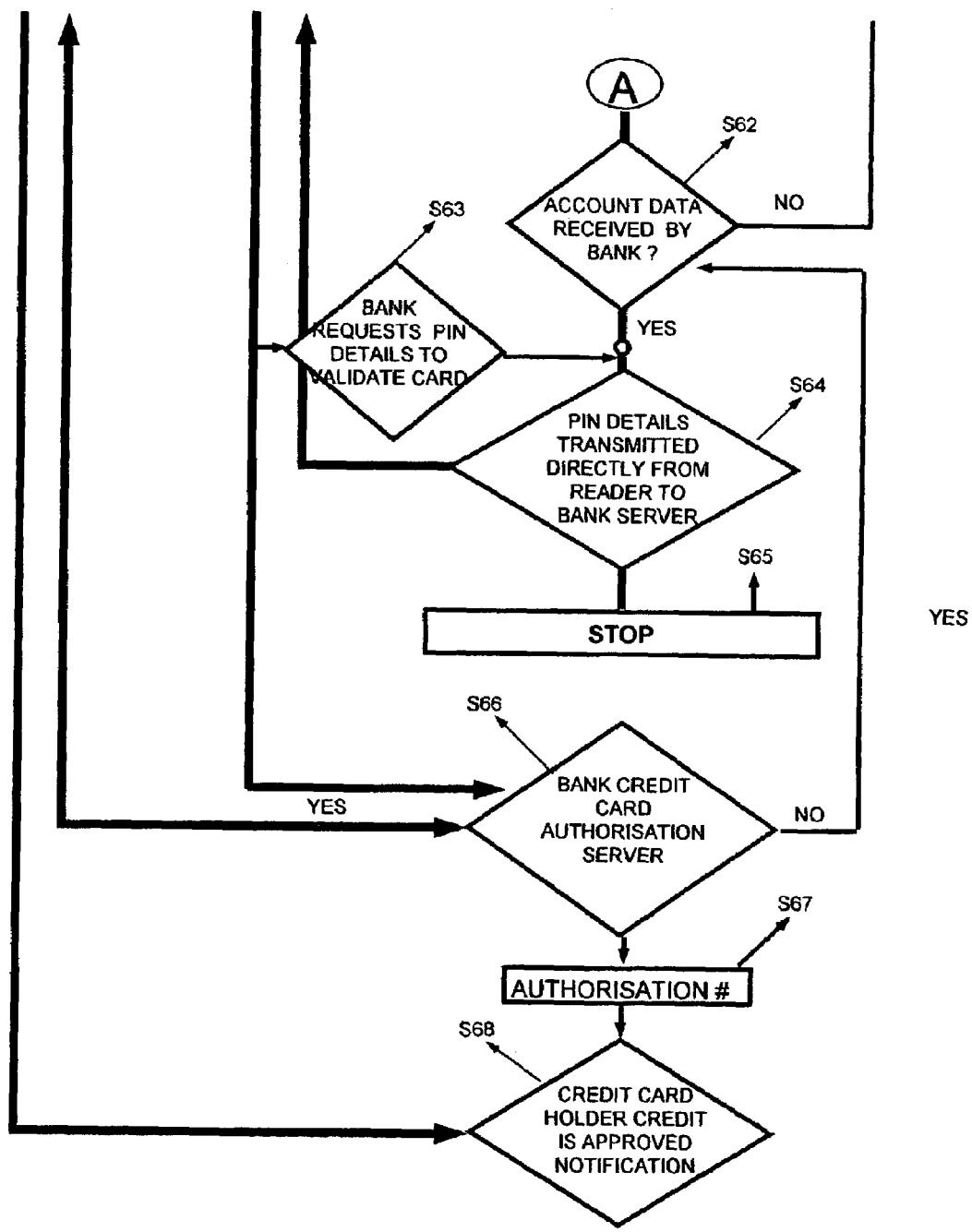
Figure 14:
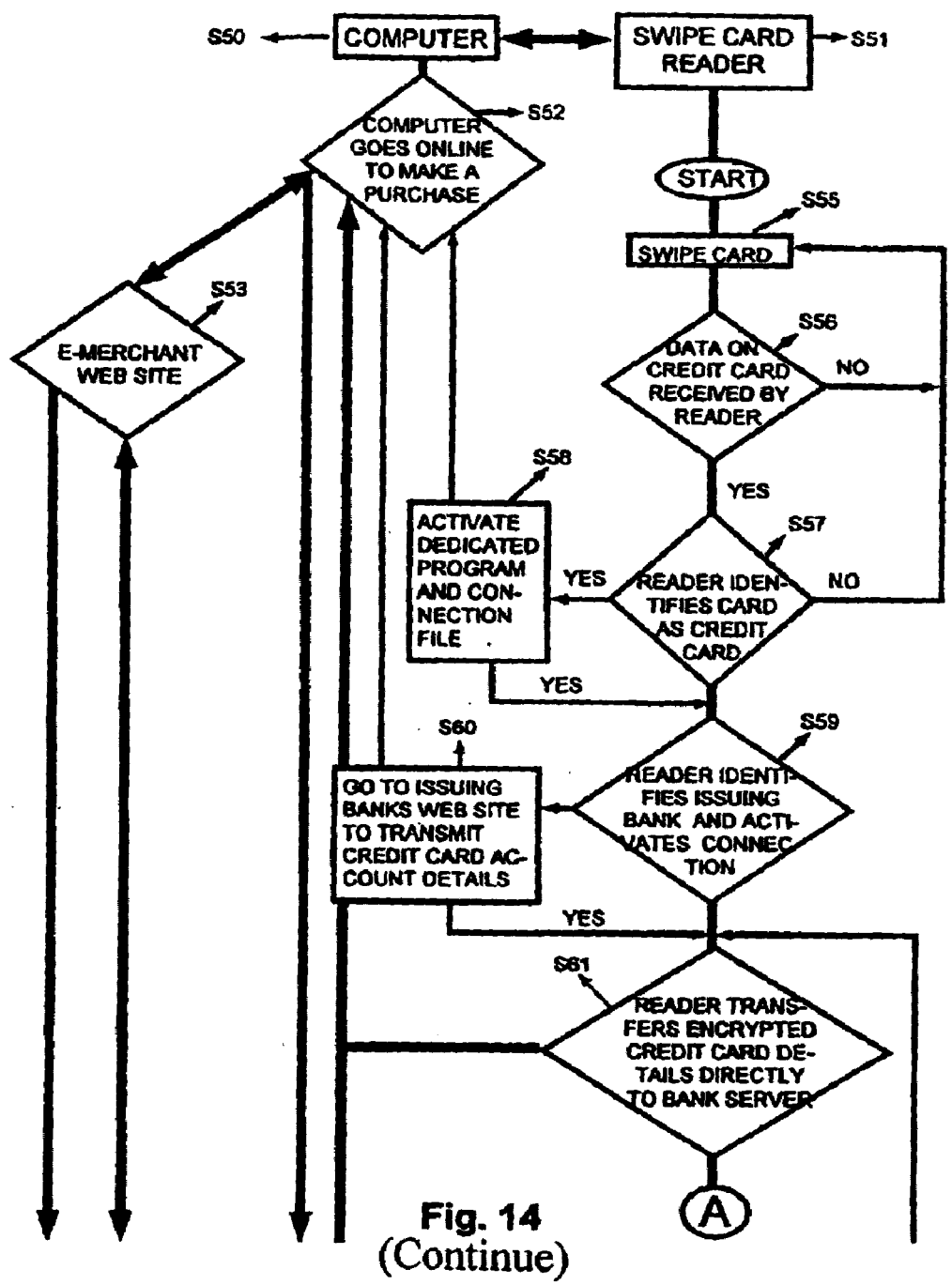

FIG. 13 is a schematic diagram of the financial transaction sequence using a magnetic stripe in accordance with an embodiment of the present invention, the data has been encrypted and is encoded onto the magnetic stripe of a swipe card according to the issuer of the swipe card and its intended use FIG. 14 is a flow diagram of the transaction sequence using a magnetic stripe in accordance with FIG. 13.

The swipe card format being used for these examples is a standard magnetic stripe swipe card ISO 7810, 7811-2-4-5-6, Alphanumeric ASCII/ANSI character set in low or high Coercivity for encoding on tracks 1, 2, 3 or 4 For encoding up to 210 bits per inch or more or less. The swipe card comprises a substrate such as a plastic, card or paper or fabric of any size supporting thereon a magnetic stripe either as tape or printed using any of the conductive magnetic inks known in the arts. The data may also be placed on any magnetic stripe readable by the dedicated reader by swiping or insertion. There may also be a swipe card read head and related CPU connected to or built into a computer or device or even WAP based mobile GSM or any other transmission technology unit that may also contain a browser, modem, phone dialer or email program to generate a communications link on the Internet from the address data as described herein. The generation of a communication link to the Internet by web site address data using a browser program or direct phone number data using a phone dialer program or e-mail address data using a mail program are all known access methods in the arts.

Due to the ever changing landscape of computer related applications and protocols many different application and protocols will be mentioned in this application. However, theses applications and protocols may change, in the spirit of this invention any preceding or new related applications and protocols should be considered as included if they are able to perform the inventive process as described.

Figure 1:
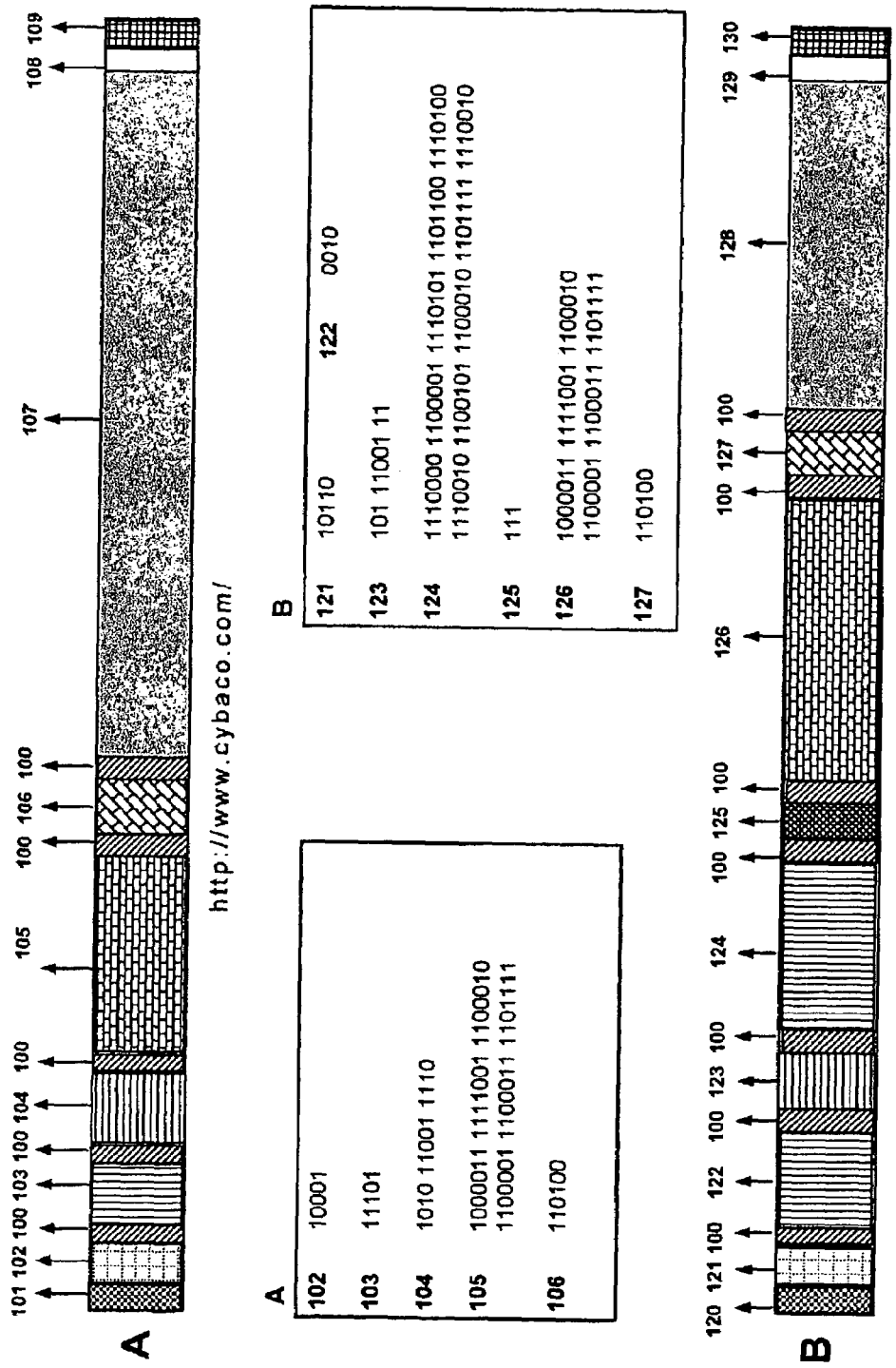

FIG. 1. is a schematic diagram of a magnetic stripe containing encrypted web site address data and e-mail address data. The magnetic stripe that is generally associated with a swipe card is encoded with a web site address data string after the information has been obfuscated into data sections or lexicons to enable the common repetitive data elements to be replaced by encrypted code thereby reducing the data string to only the elements that are not common or generic in nature. The following represent common mag stripe encoding protocols and usage, start sentinel 101, data separator 100, end sentinel 108, and parity check 109. In the example shown in FIG. 1A, the web site address "http://www.cybaco.com/" has been encrypted as follows: The encrypted data code "10001" indicates that the swipe card contains web site address data only and is placed in the data identification section 102 after the start sentinel 101 then the unique card specific data instruction code 103. Next the "http://www." being a common or generic Internet term in it's accepted usage is encrypted for this example to the coded binary number "1010" which indicates when parsed in a dedicated swipe card reader to replace this binary with "http://www." prior to the domain name. The domain name suffix ".com/" is also a common or generic Internet term and is encrypted to the coded binary number "11001", as there are now countless numbers of domain name suffixes each would have it's own binary code symbol. The binary number "1110" is used to indicate that no additional data is on the swipe card 104. The next section is where the domain name excluding any prefix or suffix and encrypted in it's entirety as the domain name represents one address as in the binary number "1000011 1111001 1100010 1100001 1100011 1101111" which is placed at 105. Next is the domain name suffix place holder "110100" used to instruct the dedicated swipe card reader where to place the domain name suffix ".com/" 106. Removing the domain name prefix and suffix leaves only the host or domain name on the swipe card and the encrypted code that instructs a dedicated swipe card reader how to de-obfuscate or parse the data string to enable recreating the complete web site address before passing it on to a browser programs address box to access the web site through an ISP on the Internet Any additional related data such as account data, security access data, server direct phone number data or other access required data would be placed in 107. With regards to the replaced data to enable shortening the Internet address this could also be replaced by musical notes that are parsed to enable the correct nomenclature or generic prefix or suffix to be entered along with the other data on the swipe card to make up an address or account number or phone number or secure site access data.

FIG. 1B In the example shown the e-mail address data string is obfuscated in a similar manner to that of web site address data. The following represent common mag stripe encoding protocols and usage, start sentinel 120, data separator 100, end sentinel 129, and parity check 130. Starting with the data code identifier "10110" that is used to identify the swipe card as containing e-mail address data 121. after the data field separator the unique card specific instruction code 122. The next section is where the "@" symbol code "101" and any domain name suffix such as ".com" "11001" is replaced by an encrypted code identifier, to reduce the repetitive generic Internet terms 123. The next section is where the entire username "1110000 1100001 1110101 1101100 1110100 1110010 1100101 1100010 1101111 1110010" would be place 124 followed by the "@" symbol place holder code "111" to indicate where the "@" symbol should be placed 125. The next section is where the host or domain name "1000011 1111001 11000101100001 1100011 1101111" excluding the suffix is placed 126 this is followed by the domain name place holder code "110100" used to indicate where to re insert the domain name suffix 127. Any additional data such as phone number, company, address, post code, or country could also be included to enable the simplified inputting of data from a business swipe card so that the data could be used in an address book if the dedicated swipe card reader determined that an address book or address data program were open at the time the swipe card was swiped 128. A dedicated swipe card reader could activate an icon that would appear on the monitor of an attached computer in this example it would indicate there was additional data that could be placed in an address book by clicking on the icon. If this method of reading a swipe card were built into a PDA unit such as a Palm Pilot the data would be placed directly into the address book. The placing of an icon could also be used for dialling a phone number encoded on a swipe card by clicking on the icon to make a call while online to a call centre, for instance, to get help filling out a form or provide advice while at the web site this could also be used in conjunction with a swipe card with web site address or server data and a phone number to access a call centre while making an online purchase that could also use web phone software to make the call.

Figure 2A:
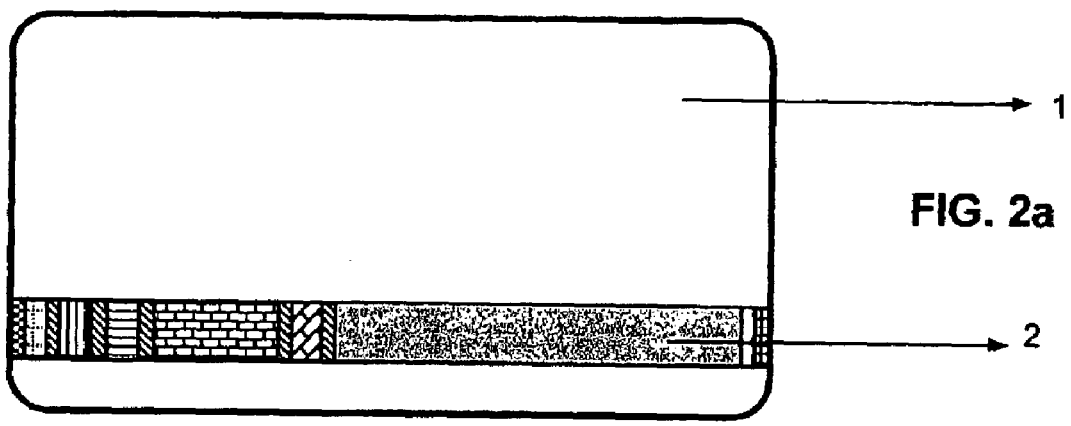

FIG. 2a shows a magnetic stripe swipe card in accordance with any of the embodiments of the present invention. The swipe card 1 contains a magnetic stripe on which address data has been encrypted prior to being encoded onto the magnetic stripe, as shown 2. This swipe card would be identified as a web site address access swipe card by a dedicated swipe card reader that would assemble the received encrypted and encoded data before passing it on to a computer or other device containing a browser program so that the decoded web site address could be placed in the address box of the browser program to enable accessing the web site through an ISP connected to the Internet.

Figure 2B:
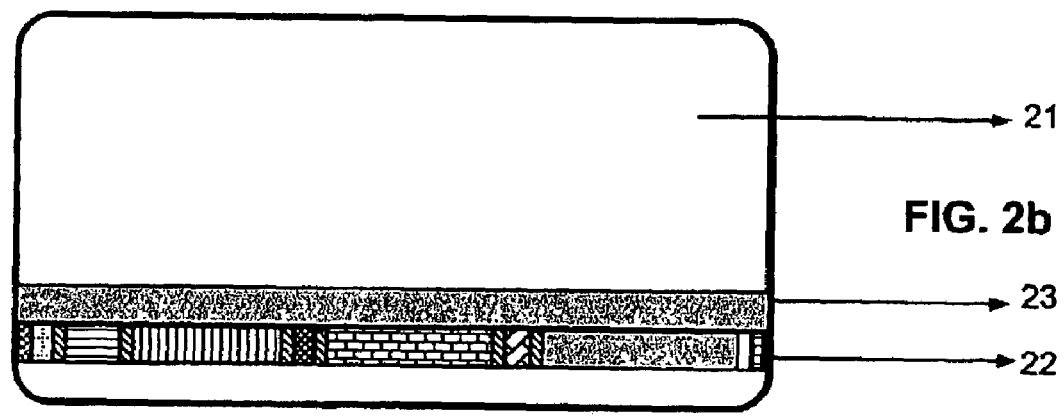

FIG. 2b shows a magnetic stripe swipe card addressing system in accordance with the first embodiment of the present invention. The swipe card 21 contains a magnetic stripe on which address data has been encrypted prior to being encoded onto the magnetic stripe, as shown 22. When this swipe card is swiped a dedicated swipe card reader would identify data on the swipe card that may also contain addition data for use by the swipe card reader. This swipe card also contains a blank track ready to be recorded on by the swipe card reader 23.

Figure 2C:
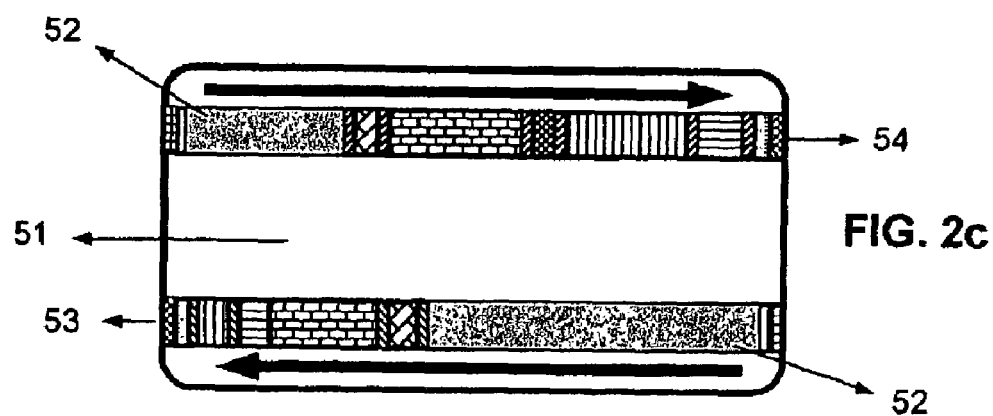

FIG. 2c shows a magnetic stripe swipe card addressing system in accordance with the first embodiment of the present invention. The swipe card 51 contains a magnetic stripe on the bottom of the card 52 showing for this example only track three on which web site address data has been encoded 53. On the top of the swipe card another magnetic stripe has been placed showing track three that e-mail address data has been encoded. 54. By including web site address data as well as e-mail address data on the same swipe card Businesses could distribute them for instance at trade shows so that a potential customer would be able to see the products and then be able to contact the individual salesman that had given the card.

The magnetic encoded swipe cards contain encrypted data to enable them to reduce the space used on the magnetic portion of a swipe card and also enable them to be distinguished from one another by a dedicated swipe card reader that would then perform the necessary actions according to the data on the particular swipe card whether it is for web site access or email addressing direct exchange phone number data, account data or for password or security. For instance a web site access swipe card may also contain a security feature that when a web site was activated there could be additional encrypted data on the swipe card that the swipe card reader holds back until the web site requests it, then the swipe card reader would send the additional data to the web site as encrypted data directly, this could then act as a key to open the locked door to a secure site that only those in possession of the required swipe card would have access to, or even be used to stop access to the Internet to those that do not posses the required swipe card. Password data may also be hidden using the steganography technique when placing the data on a swipe card so that only the swipe card reader would be able to detect it and thereby be able to transmit it to open a secure site only available to those with a swipe card.

FIG. 3a is a schematic diagram of the web site address data encoding sequence on a magnetic stripe in accordance with an embodiment of the present invention, after the web site address data has been encrypted it is ready to be encoded onto the magnetic stripe of a swipe card. The Binary digits are used to illustrate the encrypted and encoded data that would be parsed by a dedicated swipe card reader. In this example the start sentinel 301 binary number could be "101", the card identifier 302 could be "111", the data field separator 300 could be "100", followed by the unique card specific instruction code 303 that could be 1111, the domain name prefix and suffix "304" could be "0001000", then another data field separator 300 before the domain name excluding prefix and suffix 305 which would not be encrypted for this example, another data field separator 300 and the domain name suffix place holder 306 represented by "110", another data field separator 300 and then the additional data encoding space 307 that could be used in conjunction with any available related online services. The end sentinel 308 could be "1101", and the data correction check 309 could be "011". By encrypting the web site address prior to encoding enables the repetitive elements of the generic URL or domain name to be reduced to identification tag code that a dedicated swipe card reader containing the decryption code can easily parse and put back together.

FIG. 3b is a flow diagram of a web site address data encoding sequence in accordance with FIG. 3a, the encoding of data onto a swipe card sequence is basically a recording exercise using an encoding device to record the data by changing the polarity of the flux on the magnetic tape, this then indicates a binary "1" or if no change a binary "0". The magnetic stripe could be either a slurry printed or tape magnetic stripe. In this example the encoding sequence places a start sentinel to indicate that a swipe card has been swiped 301 this is then followed by a card identifier 302 to make sure that the correct action is taken by a dedicated swipe card reader when it parses the swipe card data, a data field separator 300 followed by the unique card specific instruction code 303 a data field separator 300 is then placed between the unique code instructor and the domain name prefix and suffix data 304, this data is used to instruct the dedicated swipe card reader to replace the prefix and suffix as indicated by the encrypted code, another data field separator 300 is now used to separate the domain name or URL 305 excluding any prefix or suffix, the domain name is followed by another data field separator 300 before the domain name suffix place holder 306 used to instruct the reader where to replace the domain name suffix. Another data field separator 300 is followed by additional encoding space on the magnetic stripe that could be used for any related services such as account data, phone number and account data or even just file location information 307. After this if no further data field separators are needed comes the end sentinel 308 used to inform the dedicated swipe card reader that all the data has been received which triggers the data correction check 309 checks that all the data was received as recorded, if there was an error the swipe card would have to be re swiped through the swipe card reader again.

Figure 4A:
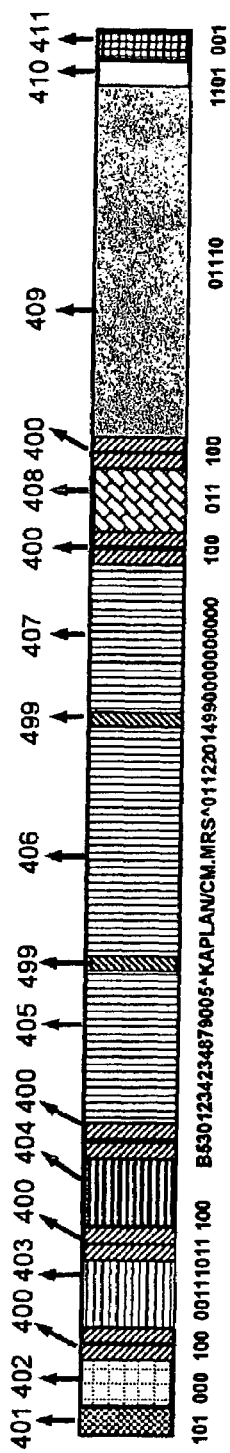
FIG. 4a is a schematic diagram of the data encoding sequence of an account card in accordance with an embodiment of the present invention.

FIG. 4a is a schematic diagram of the data encoding sequence on a magnetic stripe in accordance with an embodiment of the present invention the data has been encrypted and is encoded onto the magnetic stripe of a swipe card. The Binary digits are used to illustrate the encrypted and encoded data that would be parsed by a dedicated swipe card reader. In this example the start sentinel 401 binary number could be "101", the data code "000" used to identify the type of card being swiped 402 is followed by a data field separator 400 as "100", the reference code used to identify the unique card specific instruction data 403 may be "0111011", then another data field separator 400 and a data code to specify the level of security required by the card issuer when transmitting account details 404 and another data field separator 400 before the full account number and other individual details on the credit card which would not be encrypted for this example but left as normally found on the credit card including its own field separators as account number B5301234234879005 405, then a card field separator ˆ 499 then the name of the card holder KAPLAN/CM. MRS 406, another card field separator ˆ 499 and the expiry date and any other relevant information 01122014990000000000 407, then another data field separator 400 and the instructions with regards to request for a PIN after the account data has been transmitted 408 represented by "011", another data field separator 400 and then the additional data encoding space 409 that could be used in conjunction with any available related online services or other instruction related data for the Reader to determine "01110". The end sentinel 410 could be "1101", and the data correction check 411 could be "011". By encrypting prior to encoding enables the repetitive generic card data to be reduced to identification tag code that a dedicated swipe card reader containing the decryption code can easily parse and put back together as well as allowing non encrypted data to be placed on the card when encoding it so that a credit card may also be used in a regular retail or restaurant terminal with regards to the account *details*. *All* existing credit or debit cards could be used as the swipe card reader would be able to distinguish the issuer and activate the specific driver required to transmit data to the relevant account server by direct phone or over the *Internet*.

Figure 4B:
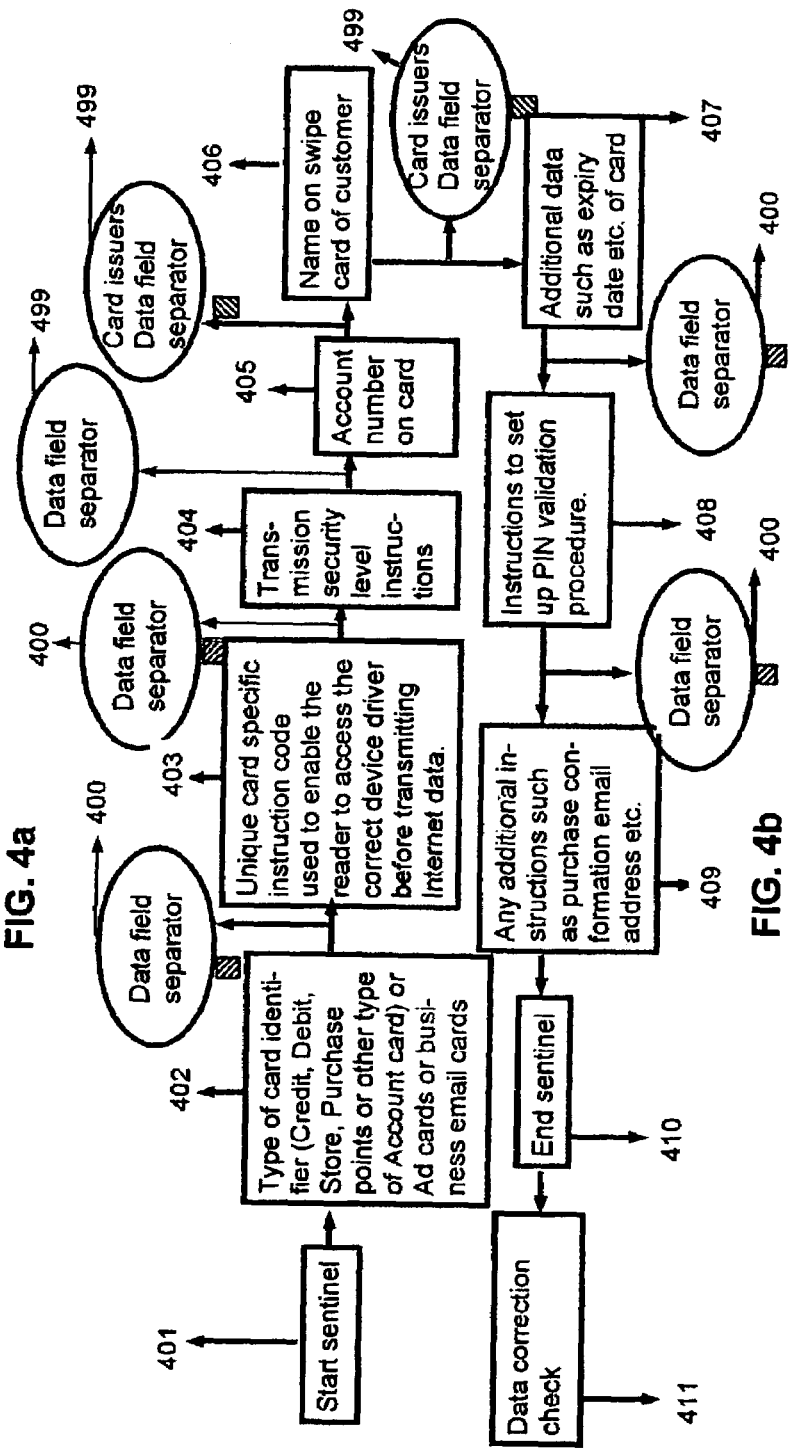
FIG. 4b is a flow diagram of a data encoding sequence of an account card in accordance with FIG. 4a, FIG. 5 is a flow diagram illustrating encrypting sequence for simple web site address access data on a swipe card.

FIG. 4b is a flow diagram of a data encoding sequence in accordance with FIG. 4a, In this example the encoding sequence places a start sentinel to indicate that a swipe card has been swiped 401 this is then followed by a data code card identifier 402 then a data field separator 400 and then to make sure that the unique device driver program file data is located in the computer by the dedicated swipe card reader when it parses the swipe card data 403, this data is used to instruct a dedicated swipe card reader to find the file containing the list of recognised card issuers and then using the unique data code identifier locate the validation or authorisation server address of the card issuer stored in the specific code file of the computing device to enable the file instructions to determine whether the validation server is through an online connection or to place a telephone number in the dial out program to make a direct connection to the server offline or a combination of placing a web site address and a phone number to use with web phone software that enables making a external phone call whilst online through an ISP, a data field separator 400 is then placed between the data code identifier and the data identifying the bank, store or company that issued the credit card and the required security when transmitting data 404, another data field separator 400 is now used to separate the account number 405, name on swipe card 406, expiry date and other personal details 407 is then followed by another data field separator 400 then instructions to activate the PIN request when the account data has been received by the card authorisation server 408, another data field separator 400 is followed by additional encoding space on the magnetic stripe that could be used for any related services offered by the card issuer or even file location information or a telephone number or even a web site address or server 409. After this if no further data field separators are needed comes the end sentinel 410 used to inform the dedicated swipe card reader that all the data has been received which triggers the data correction check 411 checks that all the data was received as recorded, if there was an error the swipe card would have to be re swiped through the swipe card reader again. This enables file or access data to be opened by password swipe cards where the password can also be generated by the swipe card reader for one off usage on a read/write reader.

Figure 5:
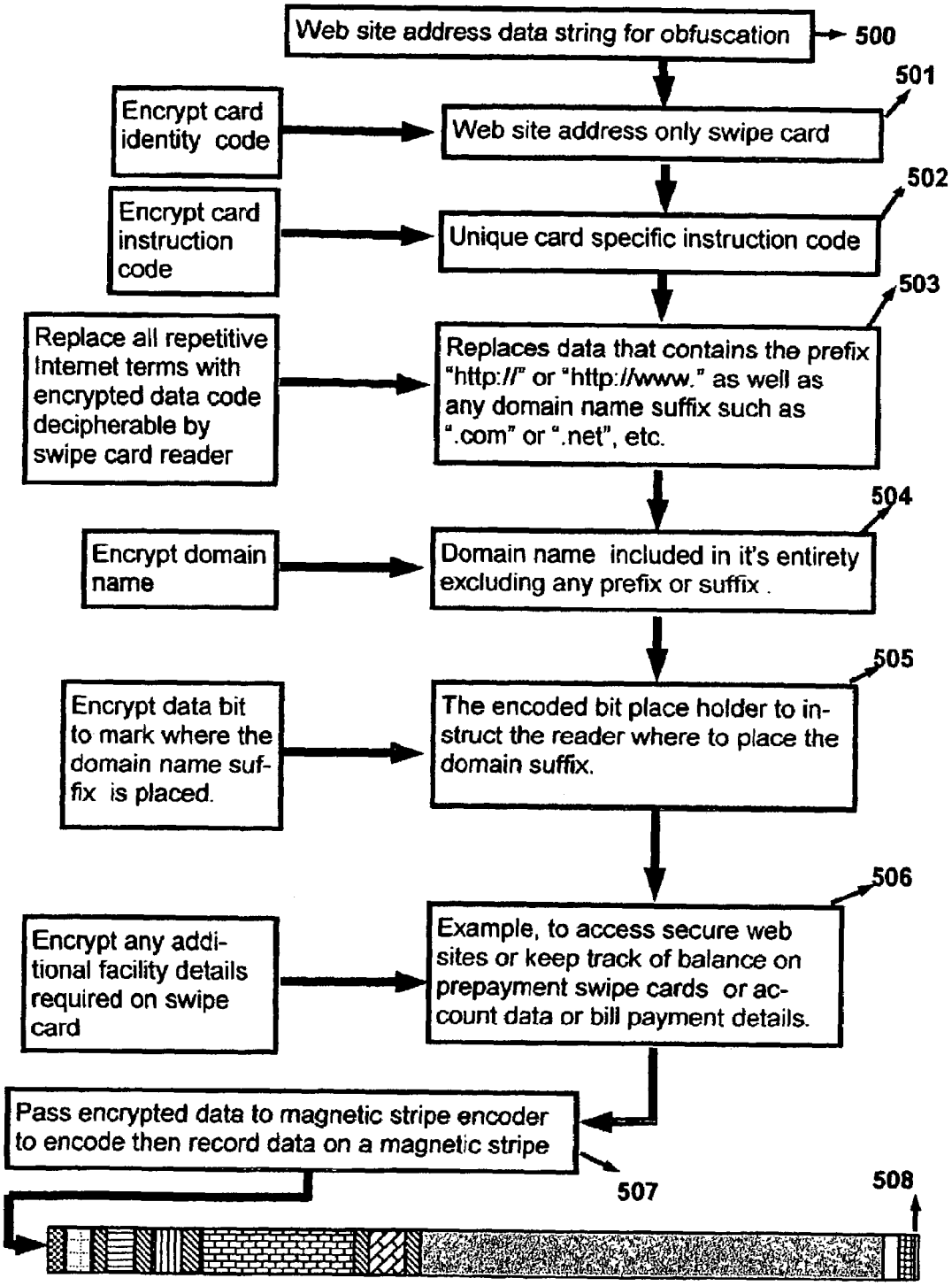

FIG. 5 is a schematic diagram of a web site address data encrypting sequence in accordance with the present invention, in order to illustrate the encrypting sequence of web site address data only and excluding any additional features that may also be included on the swipe card the web site address "http://www.cybaco.com/" will be used as way of an example. When the web site address data is presented to the encoder it is already in encrypted form which may have been performed by the swipe card data encoder itself or a computer attached to the encoder or by any other attached or remote device capable of obfuscation and transmission. Because a swipe card reader contains the a proprietary decrypting or checksum for decrypting or parsing the received data in order to reassemble the encoded and encrypted address data any repetitive data strings can be coded to enable reducing data recording space on the magnetic stripe. The web site address data is broken up into sections or a series of lexicons as follows; the "http://www." and ".com/" are each given a specific shortened binary data code that the dedicated swipe card reader is able to decode and decrypt then restore using the place holder that indicates the correct position replacement for web site address use in a browser address box. Because there are a number of different data fields that must be encoded after encryption to enable a dedicated swipe card reader to reassemble the web site address data string 500, the first encrypted portion is the card identity code that identifies the swipe card as containing only web site address data 501. followed by the unique card specific instruction code 502. Then any prefix such as "http://" or "http://www." And any suffix such as ".comf", ".co.uk/", ".net/", ".org", ."gov", or any other national or international suffix 503 is reduced to a short binary code, the actual URL or domain name excluding any prefix or suffix is encrypted as is 504, an IP address if it were static could also be used. Then a domain name suffix place holder 505 would be included to enable the dedicated swipe card reader to replace the suffix at the end of the domain name. The additional portion of the magnetic stripe 506 could be used for encrypted secure web site access that requires the swipe card to enable opening the web site for viewing or downloading of information or software, MP3 music, films, restricted web-cams, gambling, voting or any other form of secure data retrieval. This section of the swipe card 506 could also be used for placing another encrypted web site address on so that two separate web sites could be open in different windows of a computer monitor at the same time for instance one window may be a web site where purchasing items is taking place while the other could be of a web-cam at a call centre where an assistant is giving online advice or an account server open in the back ground so that a form of prepayment card account details could be used that deducts time or money from the cards account as recorded on the card when it is used to purchase items or downloads from web sites, a facility to enable placing more money on a pre-paid swipe card could be used so that the cards could be replenished as needed online or by visiting any approved retail outlet. The data string is sent to the encoder to encode the magnetic stripe with the obfuscated data 507. The obfuscated and encoded magnetic stripe 508.

Figure 6:
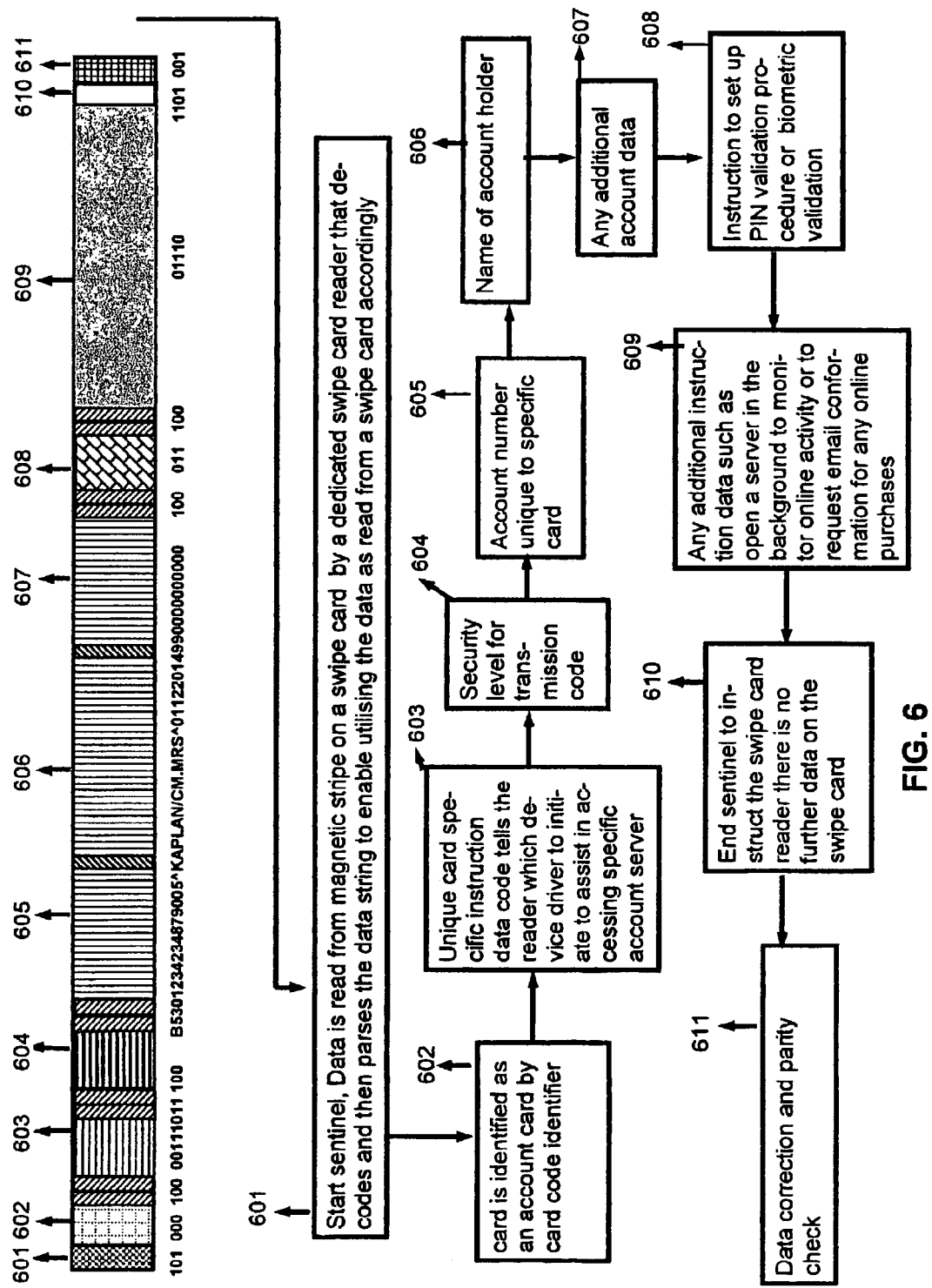
FIG. 6 is a flow diagram of the decoding and de-obfuscation sequence in accordance with embodiments of the present invention for an account card.

FIG. 6 is a flow diagram of an account card data de-obfuscation sequence in accordance with embodiments of the present invention. The account card data is read from the magnetic stripe and decoded 601 to enable the swipe card reader to parse the data string. The first operation would identify the card as being account card data from the information contained in the data code identifier 602, then the next section would be the unique card specific instruction code 603 then the level of security required to send the data encoded on the swipe card over the Internet 604 followed by the account number 605 then the account holders name 606 followed by any additional data on the card holder 507 the next section would instruct the reader to hold back data until the server a connection to the server were established and the enter a PIN or other validation method when requested by the server 608 this section could be for any additional data relevant to the card 609 then an end sentinel to tell the card nor further data 610 then the data correction parity check to make sure all the data was read correctly from the swipe card by the swipe card reader 611. Although the encrypting of the card data would be relatively low key security unless a higher level of security were required for the data encoded on a card the actual security level of the data encrypted by the swipe card reader for transmitting on the Internet would be to the level of using Block algorithms with a hash function such as DES single key or IDEA 128-bit key. Because public-key algorithms need prime numbers the generation of a random number to required size seeded by the position coordinates of the mouse pointer at the time the numbers are generated gives high security when transmitting account details or password data to enable opening access to those in possession of a swipe card and PIN or other form of verification.

Figure 7:
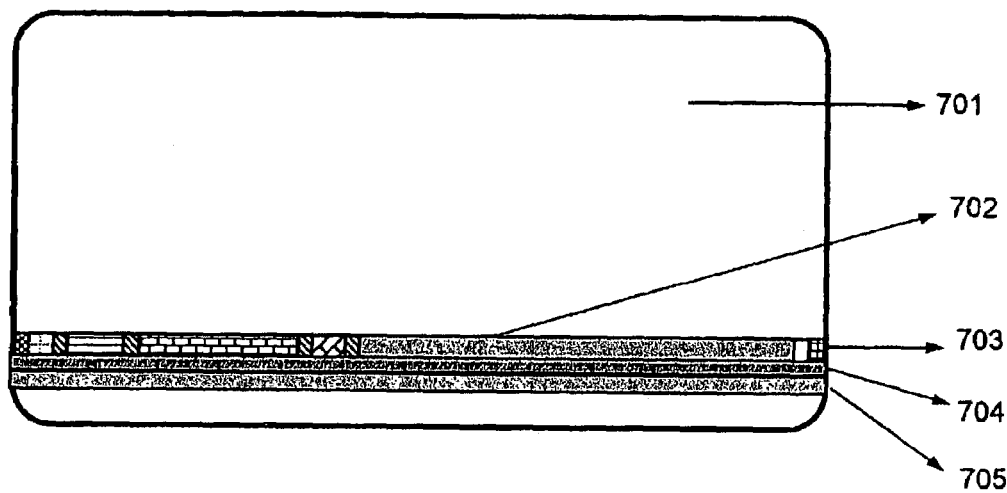
FIG. 7 is a schematic diagram of a swipe card containing three tracks one track has encoded data on it and one track of the other two tracks is a read/write track.

FIG. 7 is a schematic diagram of a swipe card containing three tracks, one track for this example ISO standard track 3 has encoded address data on it 703 and one of the other two tracks is a read/write track. The swipe card 701 comprises a substrate such as a plastic, card or paper substrate supporting thereon a magnetic stripe 702 ISO Standard #7811-4 & 7811-5. Encoded on the magnetic stripe 702 is address data 703 in the form of a domain name or URL for which a communications link is to be formed. The swipe card could be used in a dedicated swipe card reader with two read heads and one write head, the read heads for this example would be positioned on track 1 705 and 3 703, the recording head could be positioned on track 1 705 to enable the recording of data as well as being able to read it. This recording head could also be placed on track 2 or 3 704, 703 or it could be on a track 4. The benefits of having a swipe card reader that can also record data are the ability to adjust data such as purchase points on the swipe card itself or changing the address data on the card or update time remaining on a prepayment card that could be seen before getting online or the insertion of random numbers for obfuscating private key encryption algorithms. The ability to record data could also be used for added security when validating authenticity over the Internet, for instance when a the swipe card used for secure transactions is swiped through the reader it could have two tracks, one has web site or server address data and account number data on it, the other has a series of random numbers generated by the swipe card reader every time the swipe card is swiped through the reader. This random generated number would serve two purposes, one it would enable generating a unique set of random numbers used to create a floating point for encryption of PKI related security and any related encryption use by the swipe card reader each time the card were swiped, the other is to record this series of random numbers on the card after the existing random numbers are read by the swipe card reader off the swipe card to enable transmitting these original numbers to the account server when transmitting secure account data direct from the swipe card reader to the server, the server can then verify if it is the card being used was last used on the relevant account or other secure access. When the swipe card creates the random series of numbers it uses them to encrypt the account details for transferring via the Internet, the server then uses the transferred new set of random numbers and public key in conjunction with the private key to parse the account details to validate authenticity and then saves the numbers to validate that the card is genuine and not cloned copy when it is used next time, the swipe card is swiped a second time to record the random numbers over the previous set of random numbers used. As only one transaction card would have the new set of random numbers recorded on it and coupled with this the necessity of entering a PIN or some form of biometric validation makes this procedure bullet proof against hackers or card clones. If a swipe card were stolen a new card would be issued containing a series of numbers that the server would look for when it were swiped for the first time. There may be other forms of data randomly generated for placement on a swipe card such as music cords, notes or noise, tones or any data that can be randomly generated and recorded on a swipe card by using steganography to also hide the random generated numbers, This ability to enable recording on the swipe card could also be used for e-mail address data and other data for different swipe cards that are constantly changing the different methods or techniques using steganography that may be used are Substitution systems, Transform domain techniques, Spread spectrum techniques, Distortion techniques, Cover techniques, Data embedding or subliminal channels in digital signatures, they all enable secure hiding places for data for hiding messages using public key algorithms and a secret key to identify the sender.

Figure 8:
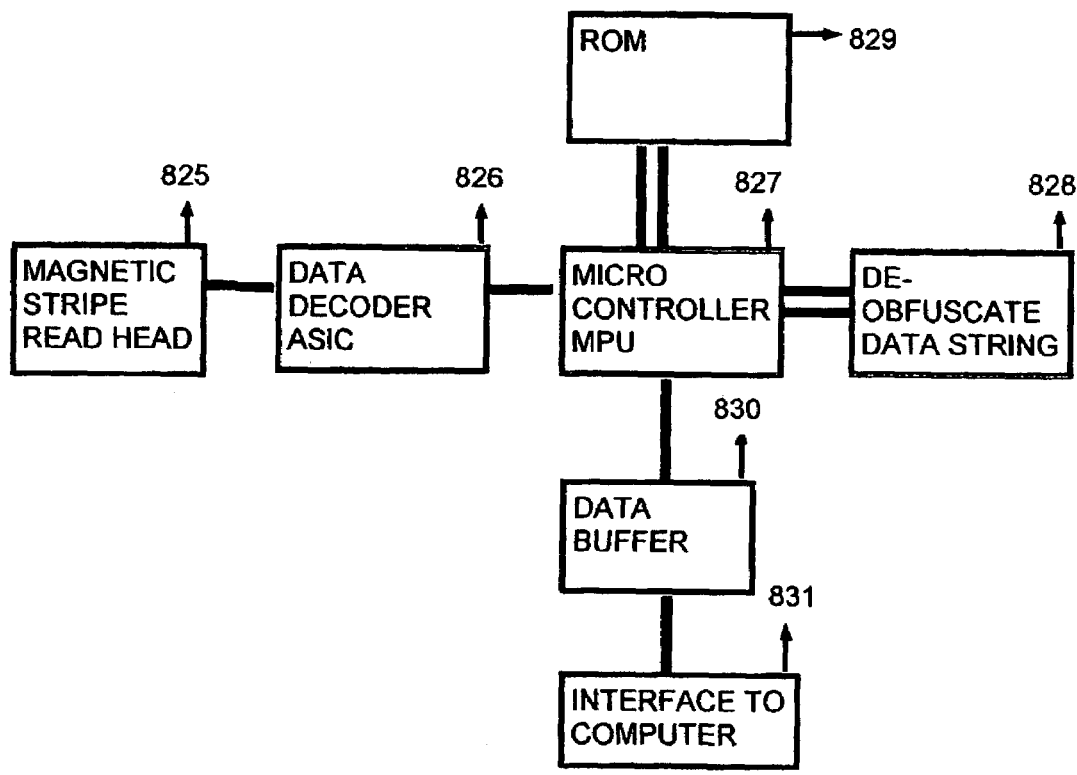
FIG. 8 is a is a block diagram of a dedicated swipe card reader.

FIG. 8 is a is a block diagram of a dedicated swipe card reader used to decode and also de-obfuscate address data read from a swipe card and the data if required may also be encrypted by the dedicated swipe card reader prior to transfering. The dedicated swipe card reader is programmed to de-obfuscate address data after it has been decoded. The address data is read by a magnetic stripe read head 825 that passes the raw data to a decoder ASIC 826 for decoding back into an encrypted data string 827 ready for de-obfuscating 828 the de-obfuscated data is then passed to the ROM 829 to activate unique instruction data at which point the ROM would determine how the data was to be processed according to the unique card specific instruction code encoded on the swipe card, before being placed into the buffer 830 to wait transfer through the interface 831 to a connected computer for this example. The data that is read by the swipe card reader may be simple access data or complex encrypted security data that first would open a connection to a web site or server then transmit encrypted data when requested to, to validate use of the card or server facility.

Figure 9:
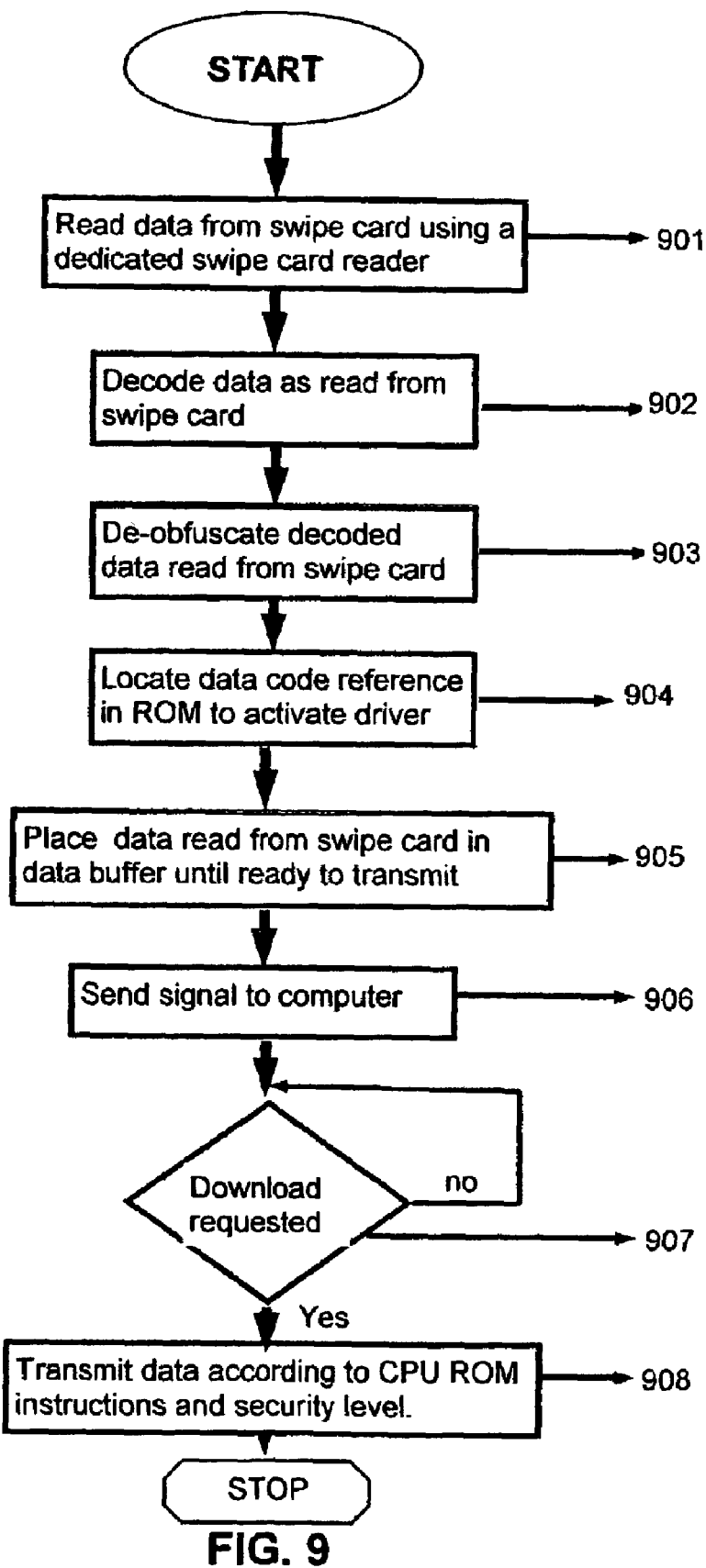
FIG. 9 is a flow diagram illustrating the use of dedicated swipe card reader of FIG. 8.

FIG. 9 is a flow diagram illustrating the use of dedicated swipe card reader of FIG. 8. When a swipe card having address data recorded on the magnetic stripe of the swipe card is swiped through a dedicated swipe card reader the magnetic read head 901 reads the data recorded on the magnetic stripe and then decodes it 902 the decoded data is then de-obfuscated 903 and transferred to the ROM 904. The MPU according to the instructions stored in the ROM sends a signal to the computer via the interface to inform it that data is waiting in the buffer 905 and requests that the data stored in the buffer can be downloaded to the computer 906 if the request is rejected for example because the required device driver program is not active, the request will activate the program so that the next request is accepted and the data is transmitted to the computer via the interface 907. Once the address data is accepted by a computer and transmitted 908 the data is used to either access a web site or address e-mail or an account server in a way already known in the arts and secure data can then be sent directly from the swipe card reader after a connection is established to enable a secure data transfer. If the data is restricted access data or account data the swipe card reader would encrypt the data prior to transmitting.

Figure 10:
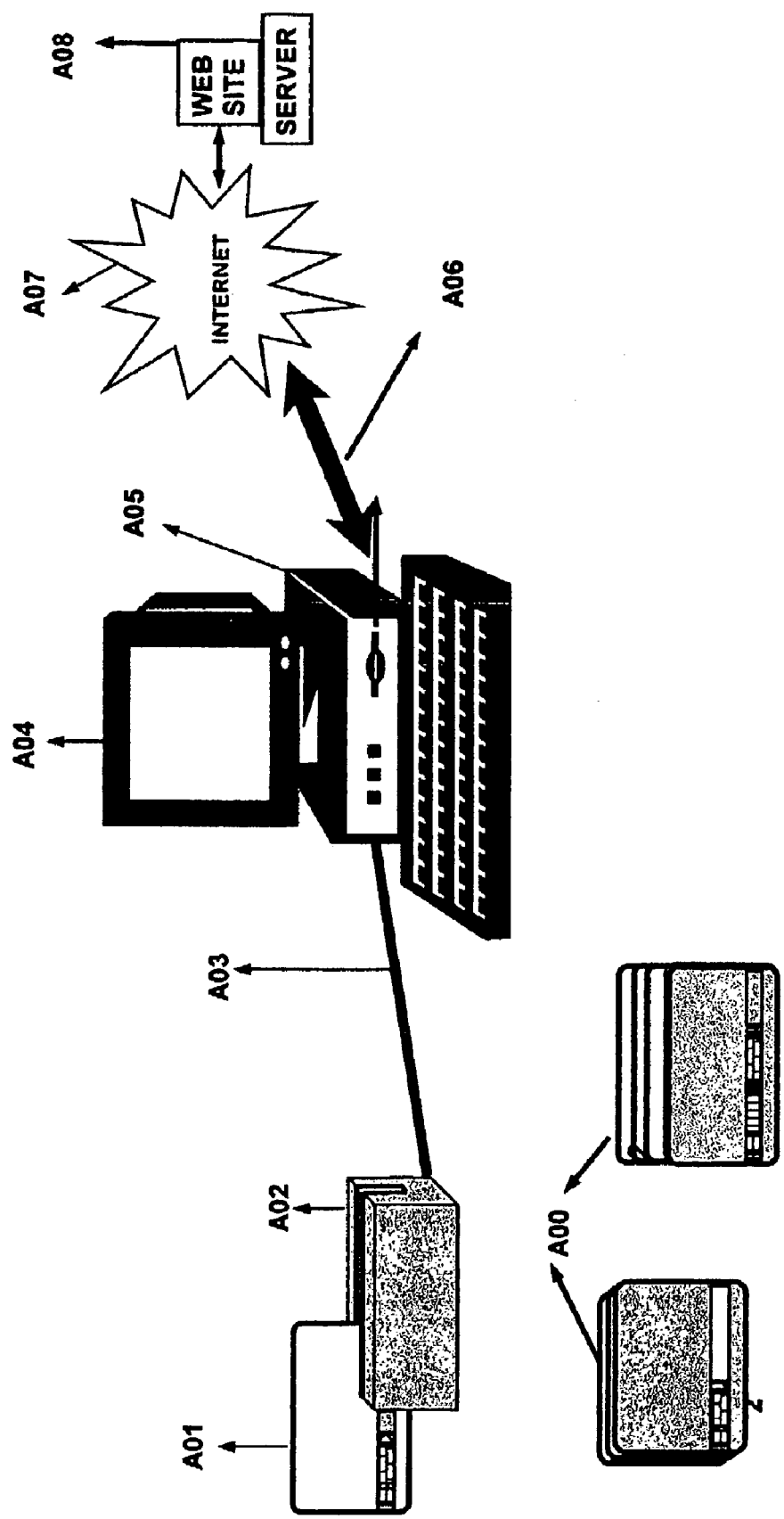
FIG. 10 is a schematic diagram illustrating a swipe card reader in accordance with an embodiment of the present invention.

FIG. 10 is a schematic diagram illustrating a swipe card reader in accordance with an embodiment of the present invention and shows a dedicated swipe card reader A02 that has one of a plurality of swipe cards A01 being swiped through the swipe card reader to enable the address data on the swipe card to be read and decoded and then de-obfuscated before an interface A03 transfer the web site or server address data to a computer A04 in this example, a browser program A05 is used to enable the transferred web site address data to access a web site or server A08 on the Internet A07 through an ISP A06. In using this invention when a swipe card A00 having a magnetic stripe on which web site address data representative of a way of forming a communications link to a web site recorded thereon is swiped through the dedicated swipe card reader the swipe card reader is arranged to read the address data on the magnetic stripe on the swipe card. The address data is then transferred to the attached computer, in this example, which causes a browser program to generate a communications link based on the address data. The dedicated swipe card reader may be built into the keyboard, mouse, mouse-mat, computer monitor, one of the drive bays, a telephone to enable phone swipe cards to be used that eliminates the need to enter in all the account numbers and exchange phone number or any number of other devices that may or may not be attached to a computer. A computer may also contain the de-obfuscation code to enable the dedicated swipe card reader to be a read head and decoder with the data then passing to a computer where the decryption is performed by the computers own CPU. The swipe cards could be of any size relative to being able to swipe a card through a slot and thereby make contact with the read head. An insertion reader and any of the remote access devises that are available including id-chips and reader and wireless chips and readers.

Figure 11:
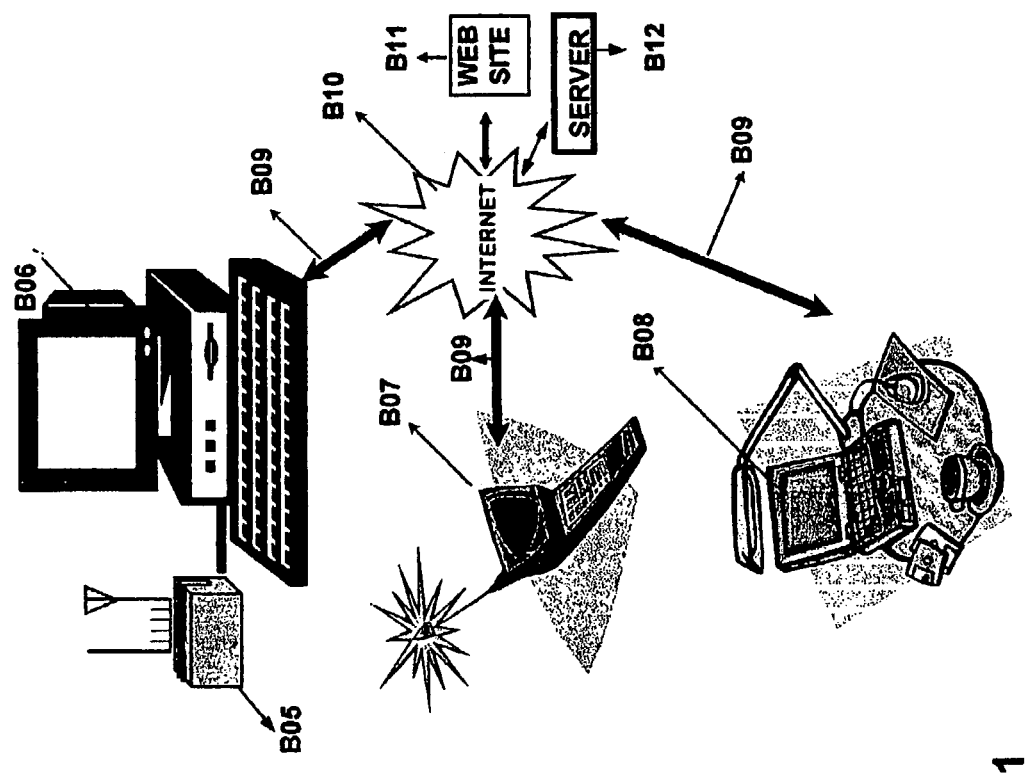
FIG. 11 is a schematic diagram illustrating a swipe card reader used for transmitting and receiving address data in accordance with an embodiment of the present invention.
Figure 11:
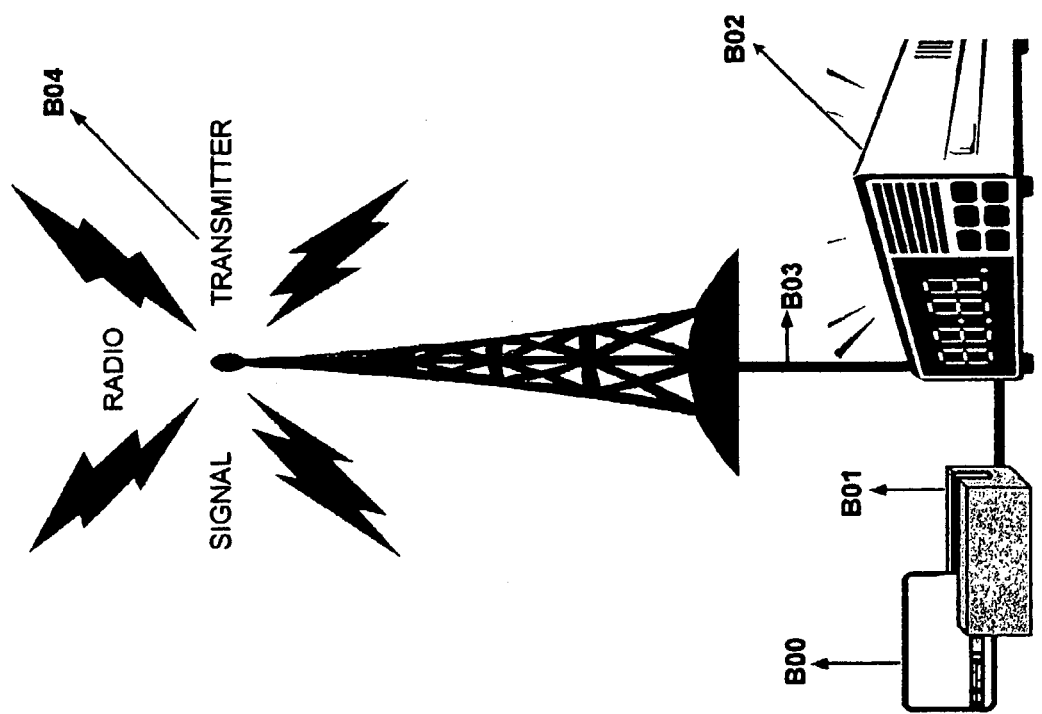

FIG. 11 is a schematic diagram illustrating a swipe card reader transmitting and receiving address data in accordance with embodiments of the present invention; After the address data has been obfuscated and then encoded and recorded onto a swipe card B00 according to previous embodiments of the present invention a dedicated swipe card reader 801 that does not decode the data merely reads it and then passes it on in the same encoded and encrypted form to a broadcast transmitter B02 where it is attached to a broadcast signal and rides piggy back B03 on the radio signal who's frequency is pre determined and then transmitted B04 with the radio signal which could be a radio transmission a television transmission or a private transmission on a selected frequency for local or short range use. The signal is then picked up by a dedicated or proprietary swipe card reader B05 or it may be a WAP or similar based is receiving device B07 with the decoding and de-obfuscating cipher built into it with or with out the read head or it could be one of the many notebook computers B08 or personal assistant devises such as the PalmPilot etc. Once the address data is received it is decoded and decrypted as described in the embodiments of the present invention by forming a link through an ISP B09 to the Internet B10 and the web site B11 or server B12. The receiving device may also receive the radio signal that the data signal is attached to. By making it easy to attach web site address data as well as e-mail address data onto a radio signal for transmission with the regular broadcasters program enables web sites to be attached along with the programs subject for instance a program on wild life could include the web sites relevant to the program on individual animal sanctuaries or the animals themselves by just swiping the card through the dedicated proprietary swipe card reader attached to the transmission or broadcast and the web site would be attached on the fly so to speak enabling advertisers to send web site addresses with their advertisements as they were being transmitted. By tuning into the frequency of a local mall for instance anyone with a WAP phone could receive the web site address of all the sales in the mall. Or e-mail addresses for instant response may be transmitted, the data being attached to a radio signal or even sent from a pager station as simple as just swiping the swipe card.

Figure 12:
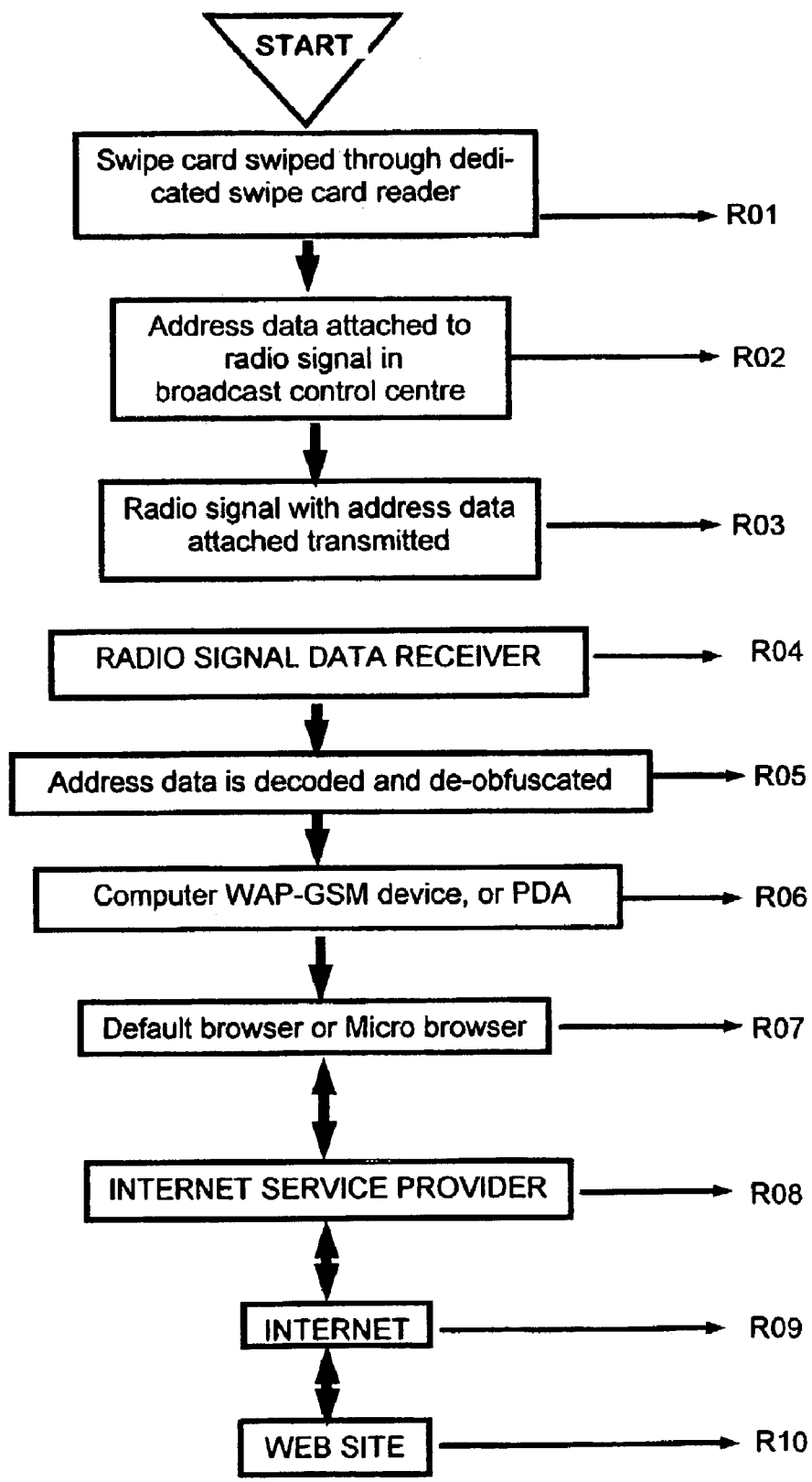
FIG. 12 is a flow diagram illustrating a swipe card reader in accordance with embodiments of FIG. 11.

FIG. 12 is a flow diagram illustrating a swipe card reader in accordance with embodiment of FIG. 11; a swipe card encoded with the address data as described in previous embodiments of this invention is swiped through a dedicated and proprietary swipe card reader R01 to enable the address data to be read and in this case the dedicated swipe card reader does not decode the address data merely reads it and passes it on to the broadcast control centre R02 to enable it to be attached to a broadcast radio signal which may be either analogue or digital The broadcast control centre transmits R03 the program with the data signal attached on the frequency designated to the broadcaster. The dedicated radio signal data receiver built into the swipe card reader uses a proprietary swipe card to set the frequency on the receiver to the stations designated frequency to enable receiving the swipe card address data being transmitted or if the dedicated swipe card reader is built into a radio then by tuning the station would also enable receiving the radio signal data R04 the radio signal receiver would only receive radio signal data containing an address label on the data signal identifying it as Internet address data. The received data is then decoded and de-obfuscated R05 or parsed in the reader that may be separate but attached to a computer, or WAP based mobile phone or other GSM device or even a PDA device such as a PalmPilot etc. R06. Once the address data is reassemble into recognisable address data it is placed into a browser or micro browser R07 to enable forming a connection to the Internet through an ISP R08 to the Internet R09 and the web site R10, the connection through an ISP to the internet is well known in the arts.

FIG. 13 is a schematic diagram of the financial transaction sequence using a magnetic stripe in accordance with an embodiment of the present invention, the data has been encrypted and is encoded onto the magnetic stripe of a swipe card according to the issuer of the swipe card and its intended use. For the purpose of transmitting secure data from the Reader a classic Alice and Bob scenario will be used Bob the sender (reader) connects to Alice the receiver (server) and requsts her public key, Alice sends Bob her public key, Bob (reader) encrypts a random number generated in the reader with Alice's key back to Alice, The random number that has been generated creates a shared secret key (Key Agreed) Alice now can receive data from Bob securely and after receiving the account data may request a PIN for safety. this is a very simple Public Key Private Key encryption or SSL/TLS that will offer the most secure transmission both parties can cope with RSA being a very secure key.

The reader is also able to generate one-time keys using a public key and the random generated number and after compressing and hashing the data could then be hidden in a multimedia file using steganography to add a bit more security. As the encryption field is for ever changing as the envelope is pushed further back it would be impossible to describe all the Algorithm techniques in the application so in the spirit of the invention using a dedicated swipe card reader any encryption technique that may be used to perform the aspects as described herein would be included, including digital signature or certificate methods, challenge response protocols or password protection and encryption to enable opening secure sites. The use of watermarking using steganography may also be used to authenticate by a code on a swipe card used for instance to download copyrighted data from the Internet legally as the swipe card would be able to verify the download as being to a paid customer or member entitled to download x number of tunes, photos or even software updates.

All access to a e-merchant web sites S10 on the Internet S06 is by way of an ISP S05 or related access Server utility and using a browser program well known in the arts. For the purpose of this example the transaction sequence using a magnetic stripe in accordance with an embodiment of the present invention shows swipe card A. S17 being swiped through a Reader S02 that has a numeric keypad built into it S01 there may also be a mouse pointer joy stick to enable random numbers to be seeded using the mouse position coordinates, the Reader is attached S03 to a computer S04 that is connected to the Internet S06 using an ISP S05 if the transaction swipe card S17 is an online banking card the web site of the bank S08 is accessed, this causes the bank to request an account number that is stored in the Readers buffer waiting for a request to transfer the data S02 that transmits the account number directly in encrypted form to the bank server S08, this is then followed for a request for a PIN, this is entered using the keypad S01 that may be built into the Reader or it may be by a keypad in a handheld device or even a keyboard. Once the account details and PIN or biometrics are verified the account holder is free to transact any online banking including paying bills, online shopping, check an account balance or transfer money from one account to another securely.

For the purpose of the next examples 3 different types of connection facilities will s be illustrated by use of swipe cards B, C, D. There are many different types of swipe card usage such as, Credit, Debit, Store, Purchase points, loyalty savers and online bank account cards including different secure site access swipe cards and different types of swipe cards used to access a web site or a prepayment card for online purchases and swipe cards with the business details encoded on them or a phone number and account number encoded phone card for use in public phones to eleviate having to enter all the account and phone number details manually this could also be connected to the Internet to make cheap international calls using web phone software if combined with the swipe card would enable fast and cheap calls.

FIG. 13 Card B. in this example is a credit card S18 that is swiped through a Reader S02 after a customer has found a web site that the customer wishes to make a purchase of goods or services from, while at the e-merchants web site S10 and in the shopping basket page ready to pay, the customer swipes the credit card S18 through the Reader S02, the Reader S02 may activate web phone software in the background and using the web phone connects S14 directly to the Banks online server S15 used to validate credit cards S18, the server S15 accepts the encrypted account details then places the e-merchant's sites S10 own e-merchant account number, a request may be made for the PIN or biometrics which is then input S01 then transmitted directly to the bank authorisation server S15, the bank server S15 then requests the amount to pay, this is transmitted from the e-merchant site S10, if there is sufficient credit on the card S18 the bank then issues an approval number to the e-merchant web site S10 and a copy to the customer by email,letter or phone. The process of approval of the credit card may also be by direct phone access S16 to the bank authorisation server S15.

FIG. 13, Card C. for this example is a Coupon swipe card S19 that saves coupon points from different e-merchant sites that offer them for visiting or purchasing goods or services. When a coupon card S19 is swiped through a Reader S02 it goes directly S13 to the coupon point account server S12 in the background that monitors S11 the different e-merchant web sites S10 that are visited S09 and then adds the monitored S11 coupon points to the individuals account number at the Coupon point Server S12 of the swipe card for visiting the sites that are in the coupon program and also if any purchases are made. These coupon points can then be redeemed as cyber money to purchase items from members and affiliates web sites S10 of the coupon program for anything up to the value of the coupon points accumulated in the account, these coupon points may also come from air-mile or other value added shopping experiences that use cyber coupons like the old Green Shield Stamps as a way to entice visitors. To check how many coupon points are in the account, the swipe card S19 is swiped while a specific key on the keypad S01 is depressed, this opens up the account file, it may also be opened by inserting a PIN number after swiping the card S00. The same method and application would be used for a prepayment swipe card to deduct or add value to.

FIG. 13, Card D. is a swipe card S20 that contains two tracks of data that would work very much the same as a one track swipe card, the main difference would be if one of the tracks in the Reader had a recording head to add data to a swipe card. In this example a phone number and a web site address that the Reader S02 determines which to use when the swipe card S20 is swiped, it may connect through the Internet S06 to a specific server S15 on the Internet that also has a direct line S16 connection to it. It also could be used to dial a specific ISP to log onto the Internet through and then to a web site, or the swipe card may have two web site addresses and a phone number or two phone numbers and a web site or two web sites and one account number or one phone number and one web site and one account number encoded on it that the Reader S02 evaluates and the determines the best way to utilise the encoded information. This direct phone line swipe card may also be used to access a leased access server to enable retrieving files from a data base and also the opening of a remote data base to access software programs to run documents or files on using the Internet. All the above combinations of data may also be included on just a one track swipe card excluding the updating of data on a swipe card, unless the Reader had a one track read/write head. In certain instances a swipe card may make a Reader determine which of the following procedures to activate, a direct phone line to a server, a web based software line to a server over the Internet or connection through an e-merchant to the bank server.

FIG. 14 is a flow diagram of the transaction sequence using a magnetic stripe in accordance with an embodiment of the present invention of FIG. 13, a computer S50 online through an ISP to an e-merchant site S53 to purchase goods from, in this example, when the selection of goods has been made a credit card is swiped S55 through the attached proprietary swipe card Reader S51 this wakes up the Reader S51 that then reads the data and decodes it S56 first the Reader determines what type of card and the unique specific instructions to implement from the data on the card after it has been swiped S57 and then sends instructions to a proprietary device driver program S58 in the attached computing device S52 then the Reader S51 determines who issued the card and the security level required to transmit the data S59 this is a process that may also rely on the information on the file data code of the swipe card in conjunction with the matching program document file data code in the attached computer S52 so that a connection S60 can then made to the credit card issuer authorisation server S66 to establish a secure connection the Reader S51 then transfers encrypted account details S61 to the bank server directly S66 when account details are received by bank S62 the bank requests a PIN S63 these PIN or biometrics verification details are transferred directly to the bank server S64 from the Reader and stops S65 if all the data has been received. The bank S66 authorises the purchase using its credit card and notifies the e-merchant account S53 of the authorisation number S67 this authorisation information is also transmitted to the card holder by email, letter or phone S68 by the bank S66 and also the e-merchant who may also email delivery details and times S53 to the card holder or customer.

By placing the selectable file data codes in a computer or any other device that is up-datable from a remote source when online enables being able to increase the number of Internet access instructions that may be applied to a multitude of different swipe cards that the Reader determines how to respond to. Creating this application to update folders and files remotely by downloading data to the corresponding data codes on a swipe card makes it far more economical to assign a different encrypted code that is placed onto a swipe card that represent the different access instructions information that would otherwise have had to be placed on the card itself which may not be possible for excessively long or complicated instructions. For example the Reader may use a code such as BB15 decoded from a swipe card to access a file in a folder in a proprietary program in an attached computing device with the name BB15, this could then have instructions on what web site to go to and whether a PIN was required, go to an account or whether to dial a phone number in a file after going to the web site or even to dial the number directly then go to the web site in the file. In this way by having a list of vacant codes that the Reader recognises and will look for in a proprietary program in an attached or built in computing device is to enable accessing the instruction data in the particular file to enable using the card online. This also enables new cards to be included by assigning one of the vacant codes in the Reader to the new card when it is encoded and them updating the proprietary program in the computing device to include the access instructions in the new card code file. This enables adding and removing the access codes with ease as new cards are added and old cards are removed. The up-dating would take place once a card has been swiped and no file exists in the computing device for the card code in the Reader as swiped, the Reader would then instruct opening an updating web site in the background that would then download the missing or new instruction file into the correct folder in the proprietary program in the computing device so that the next time the card was swiped the Reader would determine to access the related file data corresponding to the code data on the swipe card to open the correct file containing the addresses or phone number data or any other instructions. The Readers ROM would contain the codes for this example so after the Readers leave the factory it would not be possible to after them. Other examples may include updateable memory in the Reader or direct access to the computing device that would determine the action to take. The Reader itself would have sufficient memory to contain all the instructions for encrypting and transmitting data from a swipe card when it is swiped.

Although in previous embodiments the invention has been described as placing web site address or e-mail address on a swipe card this address data could also be placed on a post card with the encoded track for this example placed in accordance to the ISO standard 7811-3-5 or track 1,2, or 3. By placing the encoded magnetic stripe on a post card, individuals who receive a post card so encoded would have the opportunity to see the sights of a famous town or museum or art gallery that friends or relatives were visiting while on holiday thereby enjoying the vacation vicariously by just swiping the post swipe card. Swipe "Post Card" cards could also be used by advertisers to entice visitors to their web site if placed in Hotels or other tourist areas with a monitor and dedicated swipe card reader that could also be used to send e-mail or receive it from the post card stands containing a LCD screen and a swipe card reader to enable booking tours or making purchases directly from the stand. Another embodiment of the present invention would be the ability to place the magnetic stripe down the side of a sheet of paper such as an A4 size by printing a slurry stripe and then encoding it with all the different company or other web sites mentioned on the page, this page could then be swiped through a dedicated swipe card reader to enable going to the different web sites that could then be accessed from a file or favorites menu. The encoding would be for this example on track 1,2, or 3 or 4 of the ISO placed magnetic stripe.

A further embodiment would deal with prepayment swipe cards that could be sold with magazines and news papers for access to web sites for example the web site could be set up to restrict access depending upon the data received from the swipe card. Alternatively, the web site could have stored therein account data corresponding to the account number data for credit, debit or a pre paid swipe card and the server could be arranged to update the account data associated with the received card data, based upon monitoring the continued access of web sites on the Internet through this generated communications link. Additionally the account data may be from a service company who has supplied a swipe card so that an individual could swipe a bank supplied swipe card to go to his bank web site and account by entering a PIN number and then swipe the service company's card to enable placing the service companies bank sorting code account details in the payment line and then agree the total bill amount or enter a new amount enabling the payment of the bill from the service company directly with ease over the Internet using an online bank.

The swipe cards may also be used by stores who give points for shopping or air miles by updating a card number online or by using a swipe card to record the update on. Schools could use the swipe cards to enable teaches to assign home work that is accessed by swiping a dedicated swipe card to receive the homework by the students when home. Exams could also be unified by giving local or national exams in parity through out the area that the swipe cards are distributed, this would reduce the cost of providing paper copies of the exams that also have to be distributed securely or there is a chance that the exams may be seen before the exam takes place. Lessons could be taught by swiping cards that represent the chapters in a text or other book. Book excerpts could be placed in web sites that are accessed by swiping a card so directed. Music tracks could be down loaded using a dedicated swipe card that could also be a prepayment card to enable downloading music to a MP3 player. Election voting could be made using a swipe card to validate the right to vote, the swipe cards would need a PIN number that would be sent or e-mailed separately to the swipe card that would permit only one vote per card. Gambling could be made possible on the Internet by either a prepayment card or direct access that would then require a PIN number to gamble. Lottery could be played using a swipe card for example that contained points from a variety of coupon purchase point distributors who would agree a cash amount in exchange for points so that the points could be used to pay for lottery tickets online, prepayment cards and direct downloads could also be used. X-rated sites for adults could be accessed only by using a security prepaid or club swipe card. Libraries could have cards that assigned time to individuals when using a library computer. Computer game sites could be recorded onto swipe cards to enable following a game or being only allowed to the next level by swiping a restricted access swipe card, kids could swap them to get deeper into a game for those with the required swipe cards. The swipe card could be used on ad-packs or an ecrypting and encoding facility could be set up at trade shows to enable businesses to pass out swipe card with their catalogues featured at the web site instead of handing out expensive printed catalogues.

Although reference has been made in the specification to the use of swipe cards it will be appreciated that a smart card and reader or biometrics data could be included in conjunction with the swipe card reader.

Although some embodiment of the invention described with reference to the drawings comprise the obfuscation of the address data string by using the lexicon method of breaking the string into component parts it must be appreciated that there are other methods that could be used and different variations of encryption and parsing of data strings such as Semantic, Param aray key word split function, a Replace delimiter and a SuperTrim function, checksum function or a Insertion sort function. All would to certain degrees enable the encrypting of an address data string that could then be parsed by a dedicated swipe card reader that would reassemble the address data to it's original form by replacing the binary code that represents the removed repetitive Internet nomenclature with the prefix or suffix it replaced, to enable a browser program to access a web site on the Internet by any of the known methods in the arts. The checksum method of encrypting and decrypting or parsing data strings may be used instead of the lexicon method or the encoder may also enable encrypting at the same time as encoding the data and it must be appreciated that the diagrams of a swipe card are only representative of the embodiment of the invention and may be different for different situations and occasions and also according to the method employed. An encryption technique for transmitting data from the reader, developed by Rijndael and the one selected to replace DES for the new AES would be a good candidate as it is compact and fast and would fit within the confines of the reader and will be the standard protocol for the future, this encryption protocol could also be used by Government agencies in conjunction with the dedicated swipe card and reader for the DSS to validate payment to individuals or Immigration to complement a voucher system as this would also enable detection of where the funds were withdrawn as the swipe card readers could be set up at Post Office or other public office such as employment centres and pinged to determine the location it would also be very easy and fast to put a hold on any account.

The swipe card could also be used to gain access to server stations that may lease out memory space to individuals or companies that would maintain their own private data bases at the server location, they would then log on using just a monitor with built in video card, modem, keyboard with a built in CPU and some RAM and a mouse, that would connect them directly to the server and their own private leased data base memory by using fiber-optic cable, broadband, ADSL, ISDN, satellite or GSM or any other type of modem or data transmitter transfer system that would facilitate remote data access, usage and storage including video conferencing in real time, all without having a computer to worry about or the continual updating of both hardware and software with the added bonus of being able to log on from anywhere in the world by just swiping the magstripe card and entering the PIN using the numeric keypad, computer keyboard or using a hand held devices input procedure, this is also ideal for email sending and receiving from any location. This secure private leased memory access facility enabling only those authorised to access a particular data base may also include using a smart card and reader or even radio tag or USB port keys. The main benefits to a leased access memory data base and file server is that it makes it possible to keep personal or business files and folders in one location and the programs to run them in another, enabling the systematic backup of all files and folders by the server which also would take up less disk space because only the personal files and folders were being saved. There would always be server locations to run the files on making this a form of Global computer linked through the Internet, It would also be easy to rent software programs from dedicated servers to enable opening private folders or files to work on. The desk top would change according to the files being worked on and the software program required which may be rented daily, weekly, monthly or yearly with all updates. This brings computing down to the very basic level of individual files accessible from anywhere at anytime using a prepaid swipe card or a membership only swipe card that allows x-amount of time before charges incur for usage, this access could even be from a television set, mobile phone or even a PDA or other screened device.

The embodiments of the present invention enables individuals to settle accounts online more easily since web addresses and individual account details no longer need to be manually input. By providing swipe cards having reference data in addition to address data, a means is provided for servers or web sites to identify who is accessing then, they can then either restrict access to registered individuals or alternatively use the reference data to cause charges to be made to an account corresponding to a swipe card and thereby charge for access. Where charges are to be made the swipe cards could be sold and a remote server would merely deduct credits from a central account associated with the data on a card until all the credit points on a card had been exhausted. If a user then wished to continue to purchase goods or services online the user would be obliged to purchase a new card or download additional money to replenish the card. Book clubs could place excerpts of the top ten books and even some complete novels at a club members only web sites that is accessed by swiping a members only card to enter the site and then download an excerpt or purchasing a novel. Music tracks could be downloaded using a dedicated swipe card with the right watermark access key that would allow downloading of music through a device such as Napster legally with the swipe card that could also be a prepayment card to enable downloading music to a MP3 player. Libraries could have books of swipe cards that individuals when using a library computer could use to go to interesting web sites or just to a web site to compare prices and to make a purchase using an existing credit card. The swipe card could be used on ad-packs or an ecrypting and encoding facility could be set up at trade shows to enable businesses to pass out swipe card with their catalogues featured at the web site instead of handing out expensive printed catalogues. Speciality printers such as pronto-print or print-express may have an encoder that would be used to encode business cards with e-mail addresses and other company details ready to be inserted into an address book data program, they could also encode flyers and other low volume local work with web site addresses of local businesses. A swipe card may also contain both a telephone number and web site or server address data and account details to enable a dedicated Reader to determine whether to dial a number directly to an online server and then go to the web site or to go to a server location first then dial the number using web phone software to access a phone exchange account server directly to validate a phone card or credit or debit card information when making phone calls or purchases online and even the option to open a second window on the monitor for direct phone service (voice) access to an account manager when shopping online.

Although reference has been made in the specification to the use of swipe cards it will be appreciated that radio data tags or USB keycoders could be included or in conjunction with the swipe card Reader that may also be battery powered or solar powered to enable secure e-commerce transactions from anywhere and it must further be appreciated that any application or process described is adaptable for use in accordance with any or all of the other embodiments as described herein for this invention.

Although the embodiment of the invention described with reference to the drawings comprise a swipe card data apparatus and a process performed in a dedicated swipe card reading apparatus that may also contain a numeric keypad or be a alphanumeric phone dial pad or an LCD screen that accommodates the required number of digits for PIN usage the LCD may only have a roll through number system activated by one or two buttons that when the correct number is shown on the LCD screen the second button is pushed to move onto the next space for a number in sequence or any variations of number inputting techniques, the invention also extends to computer programs, particularly computer programs on or in a carrier adapted for putting the invention into practice. The program may be in the form of source or object code or in any other form suitable for use in the implementation of the process according to the invention. The carrier may be an entity or device such as a WAP or GSM device capable of carrying the program and having a magnetic stripe read head built in or attached. Further more, the carrier may be a transmissible carrier such as an electrical or optical cable or by radio or other means and may also be a remote control device for operating a television or other media carrier with the magnetic stripe reading head built into it and may also be a transmitting device such as "bluetooth".

The checksum method of encrypting and decrypting or parsing data strings may be used instead of the lexicon method or the encoder may also enable encrypting at the same time as encoding the data and it must be appreciated that the diagrams of a swipe card are only representative of the embodiment of the invention and may be different for different situations.

Embodiments of the present invention may also be performed in a computer when the dedicated or proprietary software is present an example would be the de-obfuscating of the address data string may performed in an attached computer or devise able to receive the swipe card address data built into it. This could also be true of the radio data receiving method by setting the required frequency and address label using a software program or digital process to enable to receive the radio data as transmitted and attached to a radio signal from any broadcast station within range of the receiving device. It should also be noted that CPU central processing unit, MPU micro processing unit, or MCU micro controlling unit are used interchangeable to refer to a memory chip. All individual aspects as described herein are interchangeable where permitting with each other in accordance with this invention.

By utilising the embodiments of this inventive process that utilises a dedicated swipe card reader and swipe card for transmitting and receiving data over the Internet it is possible to create a user friendly data bank accessible from anywhere in the world that can contain unlimited resources for data and for the accessing of said data without having to rely on smart cards being carried around with private personal data on them. The Internet has now made any data from a data base available anywhere and not only by use of a smart card when at a remote location, because now by using a dedicated swipe card reader and swipe card with an Internet connection, making it even more versatile and secure than a smart card, when a swipe card is swiped through a dedicated swipe card reader that has the read/write facility for encryption that also determines what actions are necessary to access or utilise the required data and what level of security when transmitting the data or receiving the data is called for. The read/write facility may also be on just one track for randomly changing data on a card for security that may place data for one transaction at a time relative to the transmitted data placed on a card during each swipe that replaces all existing data, this could also entail two read heads or tracks or even three combined with the record head.

The invention claimed is:

1. A system for transmitting data over a communications network comprising:
   a data carrier having a data storage area thereon storing encoded data representing Internet address data, as well as non-rewriteable instruction data indicating what level or type of security should be employed in accessing the Internet using said data carrier,
   a data carrier reader configured to read Internet address data and instruction data on data storage area of said data carrier, said data carrier reader being connected to or built into a computer system having a display, a web browser and an Internet connection, said computer system being configured to parse Internet address data stored on said data carrier through said data carrier reader, as well as said instruction data indicating level or type or security,
   an Internet server hosting one or more Internet sites corresponding to Internet address data stored on said data carrier,
   and wherein said computer system is configured to select an appropriate level or type of security for Internet communications based on said instruction data, form an Internet connection to a website corresponding to said address data by connecting to said server using the selected level or type of security for Internet communications, and then present to a user the corresponding website using said web browser and said display.

2. A system according to claim 1, wherein said Internet address data is stored in a data storage area of said data carrier in an encrypted form.

3. A system according to claim 2, wherein said computer system is configured to decrypt said Internet address data on said data carrier prior to using said Internet address data.

4. A system according to claim 1 having one or more additional data carriers having a data storage area thereon storing encoded data representing different Internet address data, and instruction data indicating what level or type of security should be employed in accessing the Internet.

5. A system according to claim 1 wherein said data carrier reader is one of a plurality of similarly configured readers.

6. A system according to claim 1 wherein said network comprises one or more wireless linkages.

7. A system according to claim 1 wherein the data additionally includes instructions for the reader or computer system to create a random series of numbers and use them to encrypt account information for transfer via the Internet, and wherein the server is configured to receive said series of random numbers and use them and the public key in conjunction with the private key to parse the account information to validate authenticity and then save the numbers onto the data carrier to validate that the data carrier is genuine and not a cloned copy when it is used the next time, and record a new set of random numbers onto the data carrier over the previous set in a future use.

8. A system for transmitting data over a communications network comprising:
   a data carrier having a data storage area thereon storing encoded data representing Internet address data, as well as non-rewriteable instruction commands indicating whether to pause after linking to a server location for the user to enter a PIN or biometric data,
   a data carrier reader configured to read Internet address data and instruction data on data storage area of said data carrier, said data carrier reader being connected to or built into a computer system having a display, a web browser and an Internet connection, said computer system being configured to parse Internet address data stored on said data carrier through said data carrier reader, as well as said instruction data,
   an Internet server hosting one or more Internet sites corresponding to Internet address data stored on said data carrier,
   and wherein said computer system is configured to form an Internet connection to a website corresponding to said address data by connecting to said server and then pause as said instruction data indicates while waiting for user to enter a PIN or biometric data and, once this PIN or biometric data has been received, send this along to the website as well, and present to a user the corresponding website data using said web browser and said display.

9. A system according to claim 8, wherein said Internet address data is stored in a data storage area of said data carrier in an encrypted form.

10. A system according to claim 8 having one or more additional data carriers having a data storage area thereon storing encoded data representing different Internet address data, and instruction data indicating whether to pause after linking to a server location for the user to enter a PIN or biometric data.

11. A system according to claim 8 wherein said data carrier reader is one of a plurality of similarly configured readers.

12. A system according to claim 8 wherein said network comprises one or more wireless linkages.

13. A system according to claim 8 wherein the data additionally includes instructions for the reader or computer system to create a random series of numbers and use them to encrypt account information for transfer via the Internet, and wherein the server is configured to receive said series of random numbers and use them and the public key in conjunction with the private key to parse the account information to validate authenticity and then save the numbers onto the data carrier to validate that the data carrier is genuine and not a cloned copy when it is used the next time, and record a new set of random numbers onto the data carrier over the previous set in a future use.

14. A system for transmitting data over a communications network comprising:
   a data carrier having a data storage area thereon storing encoded data representing Internet address data for a web phone service provider, as well as non-rewriteable instruction data indicating an account to be debited according to usage of said web phone service provider,
   a data carrier reader configured to read Internet address data and instruction data on data storage area of said data carrier, said data carrier reader being connected to or built into a computer system having a display, a web browser and an Internet connection, said computer system being configured to parse Internet address data stored on said data carrier through said data carrier reader, as well as said instruction data, an Internet server hosting one or more Internet sites corresponding to Internet address data stored on said data carrier, and wherein said computer system is configured to form an Internet connection to a website corresponding to said address data by connecting to said server and then send billing account information separately to the server according to the instructions stored on said data carrier, and enables the user to use the services of said web phone service provider.

15. A system according to claim 14 wherein said instructions on said data carrier further instruct the computer to update account data directly onto said data carrier when a recording facility is present in said data carrier.

16. A system according to claim 14, wherein said Internet address data is stored in a data storage area of said data carrier in an encrypted form.

17. A system according to claim 14 having one or more additional data carriers having a data storage area thereon storing encoded data representing Internet addresses for on or more web phone service providers, and non-rewriteable instruction data indicating an account to be debited according to usage of the one or more web phone service providers.

18. A system according to claim 14 wherein said data carrier reader is one of a plurality of similarly configured readers.

19. A system according to claim 14 wherein said network comprises one or more wireless linkages.

20. A system according to claim 14 wherein the data additionally includes instructions for the reader or computer system to create a random series of numbers and use them to encrypt account information for transfer via the Internet, and wherein the server is configured to receive said series of random numbers and use them and the public key in conjunction with the private key to parse the account information to validate authenticity and then save the numbers onto the data carrier to validate that the data carrier is genuine and not a cloned copy when it is used the next time, and record a new set of random numbers onto the data carrier over the previous set in a future use.

* * * * *